(12) United States Patent
Ashizaki et al.

(10) Patent No.: US 7,024,500 B2
(45) Date of Patent: Apr. 4, 2006

(54) DATA CONVERTING APPARATUS AND METHOD, PRINTING APPARATUS AND METHOD, PRINTING CONTROLLING APPARATUS AND METHOD, PRINTING SYSTEM AND METHOD, AND DATA TRANSMITTING METHOD FOR CONVERTING PRINT DATA

(75) Inventors: Koji Ashizaki, Tokyo (JP); Yushi Ihara, Kanagawa (JP); Takahiro Nishikawa, Kanagawa (JP); Yuji Kawamura, Kanagawa (JP); Kohei Nojiri, Saitama (JP); Tsuyoshi Ide, Chiba (JP); Toshiya Izumi, Kanagawa (JP); Kensuke Baba, Tokyo (JP)

(73) Assignee: Sony Corporation, Tokyo (JP)

( * ) Notice: Subject to any disclaimer, the term of this patent is extended or adjusted under 35 U.S.C. 154(b) by 410 days.

(21) Appl. No.: 09/826,188

(22) Filed: Apr. 4, 2001

(65) Prior Publication Data

US 2002/0059482 A1 May 16, 2002

(30) Foreign Application Priority Data

Apr. 5, 2000 (JP) ............................. 2000-108041

(51) Int. Cl.
*G06F 13/12* (2006.01)
*G06F 13/38* (2006.01)

(52) U.S. Cl. ..................... 710/65; 710/5; 710/6; 710/8; 710/16; 710/31; 710/72; 345/156

(58) Field of Classification Search ................. 710/5, 710/6, 8, 16, 31, 65, 72; 345/156
See application file for complete search history.

(56) References Cited

U.S. PATENT DOCUMENTS 5,524,184 A * 6/1996 Johnson ...................... 358/1.15
5,615,391 A * 3/1997 Klees .......................... 710/19

(Continued)

FOREIGN PATENT DOCUMENTS

EP 651556 A2 * 5/1995

(Continued)

*Primary Examiner*—Kim Huynh
*Assistant Examiner*—Angel L Casiano
(74) *Attorney, Agent, or Firm*—Frommer Lawrence & Haug LLP; William S. Frommer; Thomas F. Presson

(57) ABSTRACT

In a printing system in which with a plurality of different types of controllers connected to one serial bus, different types of print data can be inputted to and printed by a printing unit. When a set top box and desktop and portable personal computers, different in type from each other, are connected to a IEEE 1394 serial bus, screen data is outputted from the set top box to an AV/C printer and PDL data is outputted from the personal computers to the AV/C printer. The AV/C printer judges the image type of the input data. Based on the image type, the printing system converts the print data to a type of print data supported by the AV/C printer.

33 Claims, 18 Drawing Sheets

U.S. PATENT DOCUMENTS

| | | | | |
|---|---|---|---|---|
| 5,659,770 A | * | 8/1997 | Yamada | 715/530 |
| 5,671,440 A | * | 9/1997 | Curry | 345/656 |
| 5,793,937 A | * | 8/1998 | Chura et al. | 358/1.16 |
| 5,845,144 A | * | 12/1998 | Tateyama et al. | 712/1 |
| 6,094,276 A | * | 7/2000 | Yamaguchi et al. | 358/1.15 |
| 6,226,095 B1 | * | 5/2001 | Fukuta | 358/1.13 |
| 6,229,884 B1 | * | 5/2001 | Toyoda et al. | 379/100.08 |
| 6,249,835 B1 | * | 6/2001 | Isoda | 710/100 |
| 6,477,587 B1 | * | 11/2002 | Isoda et al. | 710/6 |
| 6,687,453 B1 | * | 2/2004 | Sakamoto et al. | 386/46 |
| 2001/0048531 A1 | * | 12/2001 | Hisada | 358/1.13 |

FOREIGN PATENT DOCUMENTS

| | | | | |
|---|---|---|---|---|
| JP | 09240080 A | * | 9/1997 | |
| JP | 09325867 A | * | 12/1997 | |

* cited by examiner

|  | msb | | | | | | lsb |
|---|---|---|---|---|---|---|---|
| opcode | \multicolumn{7}{c\|}{OPERATION MODE($41_{16}$)} |
| operand [0] | \multicolumn{7}{c\|}{subfunction} |
| operand [1] | \multicolumn{7}{c\|}{status} |
| operand [2] | \multicolumn{7}{c\|}{next_pic} |
| operand [3] | \multicolumn{7}{c\|}{next_page} |
| operand [4] | | | | | | | |
| operand [5] | \multicolumn{7}{c\|}{print_job_ID} |
| ⋮ | | | | | | | |
| operand [16] | | | | | | | |
| operand [17] | \multicolumn{7}{c\|}{Operation_mode_parameters} |
| ⋮ | | | | | | | |
| operand [24] | | | | | | | |
| operand [25] | \multicolumn{7}{c\|}{Operation_mode_optional_parameters} |
| ⋮ | | | | | | | |
| operand [29] | | | | | | | |
| operand [30] | \multicolumn{7}{c\|}{reserved} |
| operand [31] | | | | | | | |
| operand [32] | | | | | | | |

FIG.6

| Address Offset | Contents |
|---|---|
| $00_{16}$ | media_type |
| $01_{16}$ | Media_size |
| $02_{16}$ | |
| $03_{16}$ | |
| $04_{16}$ | reserved |
| $05_{16}$ | Print_quality |
| $06_{16}$ | Mono_color |
| $07_{16}$ | offset |
| $08_{16}$ | |
| $09_{16}$ | |
| $0A_{16}$ | |
| $0B_{16}$ | Layout_type |
| $0C_{16}$ | |
| $0D_{16}$ | |
| $0E_{16}$ | |

FIG.7

| | msb | | | | | | lsb |
|---|---|---|---|---|---|---|---|
| opcode | \multicolumn{7}{c|}{CAPTURE($42_{16}$)} |
| operand [0] | \multicolumn{7}{c|}{subfunction} |
| operand [1] | \multicolumn{4}{c|}{source_subunit_type} | \multicolumn{3}{c|}{source_subunit_ID} |
| operand [2] | \multicolumn{7}{c|}{source_plug} |
| operand [3] | \multicolumn{7}{c|}{status} |
| operand [4] | \multicolumn{7}{c|}{dest_plug} |
| operand [5] | | | | | | | |
| ⋮ | \multicolumn{7}{c|}{print_job_ID} |
| operand [16] | | | | | | | |
| operand [17] | | | | | | | |
| operand [18] | \multicolumn{7}{c|}{data_size} |
| operand [19] | | | | | | | |
| operand [20] | | | | | | | |
| operand [21] | \multicolumn{7}{c|}{image_size_x} |
| operand [22] | | | | | | | |
| operand [23] | \multicolumn{7}{c|}{image_size_y} |
| operand [24] | | | | | | | |
| operand [25] | \multicolumn{7}{c|}{image_format_specifier} |
| operand [26] | | | | | | | |
| operand [27] | | | | | | | |
| operand [28] | \multicolumn{7}{c|}{reserved} |
| operand [29] | | | | | | | |
| operand [30] | \multicolumn{7}{c|}{Next_pic} |
| operand [31] | \multicolumn{7}{c|}{Next_page} |
| operand [32] | | | | | | | |

FIG.8

| Value(MSB) | Value(LSB) | Type | Meaning |
|---|---|---|---|
| $00_{16}$ | sRGB raw | | |
| | $00_{16}$ | sRGB raw | |
| | $01_{16}$ | sRGB raw,quadlet | |
| $01_{16}$ | YCC raw | | |
| | $0X_{16}$ | YCC4:2:2 raw/pixel | |
| | $1X_{16}$ | YCC4:2:2 raw/line | |
| | $8X_{16}$ | YCC4:2:0 raw/pixel | |
| | $9X_{16}$ | YCC4:2:0 raw/line | |
| | $X0_{16}$ | Pixel ratio 1.00×1.00 / ITU-R BT.709-2 / interlace | |
| | $X1_{16}$ | Pixel ratio 1.19×1.00 / ITU-R BT.709-2 / interlace | |
| | $X2_{16}$ | Pixel ratio 0.89×1.00 / ITU-R BT.709-2 / interlace | |
| | $X3_{16}$ | Pixel ratio 1.00×1.00 / ITU-R BT.601-4 / interlace | |
| | $X8_{16}$ | Pixel ratio 1.00×1.00 / ITU-R BT.709-2 / progressive | |
| | $X9_{16}$ | Pixel ratio 1.19×1.00 / ITU-R BT.709-2 / progressive | |
| | $XA_{16}$ | Pixel ratio 0.89×1.00 / ITU-R BT.709-2 / progressive | |
| | $XB_{16}$ | Pixel ratio 0.89×1.00 / ITU-R BT.601-4 / progressive | |
| $10_{16}$ | DCF Object | | |
| | $00_{16}$ | Exif 2.1 | |
| | $01_{16}$ | JFIF | |
| | $02_{16}$ | TIFF | |
| | $0F_{16}$ | JPEG | |

FIG.9

| Value (MSB) | Value (LSB) | Type | Meaning |
|---|---|---|---|
| $40_{16}$ | Page Description Language | | |
| | $03_{10}$ | PCL | HP-GL/2 is included as part of the PCL language (PCL and HP-GL/2 are registered trademarks of Hewlett-Packard Company.) |
| | $04_{10}$ | HP-GL | Hewlett-Packard Graphics Language (HP-GL is a registered trademark of Hewlett-Packard Company.) |
| | $05_{10}$ | PJL | Peripheral Job Language (Hewlett-Packard Co.) |
| | $06_{10}$ | PS | PostScript Language (Postscript is a trademark of Adobe Systems Incorporated.) |
| | $07_{10}$ | IPDS | Intelligent Printer Data Stream (IBM) |
| | $08_{10}$ | PPDS | IBM Personal Printer Data Stream (Lexmark International,Inc.) |
| | $09_{10}$ | EscapeP | ESC/P (Epson Corp.) |
| | $10_{10}$ | Epson | (Epson Corp.) |
| | $11_{10}$ | DDIF | Digital Document Interchange Format (Digital Equipment Corp.) |
| | $12_{10}$ | Interpress | (Xerox Corp.) |
| | $13_{10}$ | ISO6429 | Control functions for Coded Character Sets (ISO Standard) |
| | $14_{10}$ | LineData | Lines of data as separate ASCII or EBCDIC records and containing no control functions(no CR,LF,HT,FFetc.).(See ISO 10175 Document Printing Application(DPA)) (ISO Standard) |
| | $15_{10}$ | MODCA | Mixed Object Document Content Architecture (IBM) |
| | $16_{10}$ | REGIS | Remote Graphics Instruction Set (Digital Equipment Corp.) |
| | $17_{10}$ | SCS | SNA Character String Bi-directional print data stream for SNA LU-1 mode of communications (IBM) |
| | $18_{10}$ | SPDL | ISO 10180 : Standard Page Description Language (ISO Standard) |
| | $19_{10}$ | TEK4014 | Tektronix 4014 Graphics Terminal (Tektronix Corp.) |

FIG.10

| Value (MSB) | Value (LSB) | Type | Meaning |
|---|---|---|---|
| | $20_{10}$ | PDS | |
| | $21_{10}$ | IGP | (Printronix Corp.) |
| | $22_{10}$ | CodeV | Magnum Code-V,Image and printer control language (QMS,Inc) |
| | $23_{10}$ | DSC-DSE | Data Steam Compatible and Emulation Bi-directional print data stream for non-SNA(DSC) and SNA LU-3 3270 controller (DSE) communications (IBM) |
| | $24_{10}$ | WPS | Windows Printing System (Microsoft Corporation.) |
| | $25_{10}$ | LN03 | Early DEC-PPL3 (Digital Equipment Corp.) |
| | $26_{10}$ | CCITT | |
| | $27_{10}$ | QUIC | Quality Information Code (QMS,Inc) |
| | $28_{10}$ | CPAP | Common Printer Access Protocol (Digital Equipment Corp.) |
| | $29_{10}$ | DEC-PPL | Degital ANSI-Compliant Printing Protocol (Digital Equipment Corp.) |
| | $30_{10}$ | Simple Text | character coded data,including NUL,CR,LF, HT,and FF control characters,(See ISO 10175 Document Pinting Application(DPA)) (ISO Standard) |
| | $31_{10}$ | NPAP | Network Printer Alliance Protocol(This protocol has been superseded by the IEEE1284. 1 TIPSI Std (ref,TIPSI=$49_{10}$)) |
| | $32_{10}$ | DOC | Document Option Commands (QMS,Inc) |
| | $33_{10}$ | ImPRESS | (QMS,Inc) |
| | $34_{10}$ | Pinwriter | 24 wire dot matrix printr for USA,Europe,and Asia except Japan. (NEC) |
| | $35_{10}$ | NPDL | Page printer for Japanese market (NEC) |
| | $36_{10}$ | NEC201PL | PC-PRO201 Series:Serial printer language used in the Japanese market. (NEC) |
| | $37_{10}$ | Automatic PDL sensing | Automatic sensing of the interpreter language family by the printer examining the document content.Which actual interpreter language families are sensed depends on the printer implementation. |
| | $38_{10}$ | Pages | Page printer Advanced Graphic Escape Set (IBM Japan) |
| | $39_{10}$ | LIPS | LBP Image Processing System |

FIG.11

| Value (MSB) | Value (LSB) | Type | Meaning |
|---|---|---|---|
| | $40_{10}$ | TIFF | Tagged Image File Format (Aldus) |
| | $41_{10}$ | Diagnostic | A hex dump of the input to the interpreter |
| | $42_{10}$ | PSPrinter | The PostScript Language used for control (with any PDLs) (Adobe Systems Incorporated) |
| | $43_{10}$ | CaPSL | Canon Print Systems Language (Canon Inc.) |
| | $44_{10}$ | EXCL | Extended Command Language (Talaris Systems Inc.) |
| | $45_{10}$ | LCDS | Line Conditioned Data Stream (Xerox Corporation) |
| | $46_{10}$ | XES | Xerox Escape Sequences (Xerox Corporation) |
| | $47_{10}$ | PCLXL | Printer Control language.Extended language features for printing,and printer control. (Hewlett-Packard Co.) |
| | $48_{10}$ | ART | Advanced Rendering Tools (ART IV) (Fuji Xerox Co.,Ltd.) |
| | $49_{10}$ | TIPSI | Transport Independent Printer System Interface (ref.IEEE Std.1284.1) |
| | $50_{10}$ | Prescribe | Technical reference manual: "PRESCRIBE II Programming Manual" |
| | $51_{10}$ | LinePrinter | A simple-text character stream which supports the control codes LF,VT,FF,and plus Centronics or Dataproducts Vertical Format Unit(VFU) language |
| | $52_{10}$ | IDP | Imaging Device Protocol (Apple Computer.) |
| | $53_{10}$ | XJCL | Xerox Job Control Language (JCL) (Fuji Xerox Co.,Ltd.) |
| | $54_{10}$ | PDF | Adobe Portable Document Format (Adobe Systems,Inc.) |
| | $55_{10}$ | RPDL() | Ricoh Page Description Language for printers (RICHO,Co.LTD) |
| | $56_{10}$ | IntermecIPL | Intermec Printer Language for label printers (Intermec Corporation) |
| | $57_{10}$ | UBIFingerprint | An intelligent basic-like programming language for label printers. (United Barcode Industries) |
| | $58_{10}$ | UBIDirectProtocol | An intelligent control language for label printers. (United Barcode Industries) |
| | $59_{10}$ | Fujitsu Printer Language | (FUJITSU LIMITED) |
| $80_{16}$ ~ $8F_{16}$ | $59_{16}$ ~ $FF_{16}$ | Vendor Dependent format | |
| $FE_{16}$ | | Special meaning | |
| | $00_{16}$ | Unit Plug defined | |
| | $01_{16}$ | Don't care | |

FIG.12

DATA CONVERTING APPARATUS AND METHOD, PRINTING APPARATUS AND METHOD, PRINTING CONTROLLING APPARATUS AND METHOD, PRINTING SYSTEM AND METHOD, AND DATA TRANSMITTING METHOD FOR CONVERTING PRINT DATA

BACKGROUND OF THE INVENTION

1. Field of the Invention

The present invention relates to a data converting apparatus and method, printing apparatus and method, printing controlling apparatus and method, printing system and method and a data transmitting method, suitable for use in a system in which a printer and a plurality of print data transmitters are connected to a common serial bus and connected to each other by a method conforming to the IEEE (Institute of Electrical and Electronics Engineers) 1394 standard for example to make a printing work at a printing unit.

2. Description of the Related Art

Conventionally, the printing work made by a printer uses a printer control code (called "escape sequence") to control the printing work and a page-description language (PDL) which is an image depiction programming language. These printer control code and page-description language are available in tens of types correspondingly to the series of printers and printer manufacturers, and further in hundreds of types including ones classified in detail by printer type.

The above page-description languages include ESC/P and ESC/Page from Seiko-Epson, LIPS from Canon, PCL (HP-PCL) from Hewlett-Packard, PostScript from Adobe Systems, etc. The PDL languages classified in further detail include PCL3 and PLC5 (series of the PCL), and further the PCL3 is partially modified and defined for each of the printers as the case may be.

Besides, the page-description languages not dependent on the printer manufacturers include ISO/IEC 10180: SPDL (standard page-description language) (December, 1995) etc. which however have not spread so widely because of the compatibility with the page-description languages used in the past.

As a method for establishing a physical connection between a print data transmitter which holds print data and information on a printing and a printer, there are available methods defined in the IEEE (Institute of Electrical and Electronics Engineers) 1284, USB (universal serial bus), IEEE 1394 SBP (serial bus protocol) 2, and IEEE 1394 DPP (direct print protocol).

The above IEEE 1284 is featured by the compatibility with the Centronics, basic point-to-point connection between a personal computer (PC) as a print data transmitter and a printer, and transmitting of data when the printer is not busy (push transaction).

The above USB is featured by the possible connection between a single host unit and 127 node units, management of all the node units by the host unit, and the basic principle that data is transferred between the host unit and node units but data cannot be transferred directly between the node units.

The above IEEE 1394 SBP2 prescribes the arrangement for issuing a command from a major control unit (initiator) connected to a serial bus to a controlled unit (target) connected also to the serial bus, and arrangement for transferring a series of data and statuses appended to a command issued from the initiator. Further, this IEEE 1394 SBP2 prescribes a framework for appending an SCSI (small computer system interface) command set as a high-order command set, and it is featured by the service of a memory shared by both the initiator (print data transmitter) and target (printer), and read and write from and to the common memory existent at the initiator side by the target.

The above IEEE 1394 DPP is a data transfer protocol (thin protocol) and prescribes no function to provisionally reserve a processing command at the printer side, and is featured by the possible broadcast-to-broadcast physical connection.

Connection of a plurality of controllers and a plurality of targets to the serial bus according to the above standards will incur the following problems.

That is, the IEEE 1284 prescribes no function to reserve a control command transmitted from another unit to a printer when the printer is in the course of printing, namely, when it is busy. Therefore, the IEEE 1284 is not suitable for use in an environment in which many AV units and PCs are connected to the serial bus conforming to the IEEE 1284.

Also the USB prescribes that only one host unit should be used to manage node units connected thereto, and so it is not suitable for practical use since a large load will be applied to the host unit in an environment in which many AV units and PCs are connected to the USB serial bus.

Further, the IEEE 1394 SBP2 enables a broadcast-to-broadcast connection by utilizing the physical connection prescribed in the IEEE 1394, but this protocol is not suitable for use in an environment in which many AV units and PCs are connected to the 1394 serial bus.

Moreover, since the IEEE 1394 DPP has no function to provisionally hold a processing command at the printer side, so it cannot deal with printing requests from two or more AV units and PCs connected in the printing system.

Other problems take place when a plurality of controllers uses different printer control codes and page-description languages. In an environment in which many AV units and PCs are connected to the 1394 serial bus, the printer is highly required to be compatible with the printer control code and page-description language. However, it has been proved that when no printer driver compatible with the printer as a target is provided at the controller side, no printing work can be done in many cases.

To avoid the above-mentioned problems, it has been proposed to connect a print data transmitter and printer to the IEEE 1394 serial bus and effect a printing work according to the AV/C printing protocol using the AV/C command (AV/C digital interface command set).

With such an AV/C printing protocol, the printer side can reserve control commands such as a print data transmitting command or the like provisionally and effect steps of a printing work in the order of the reserved control commands, according to a command protocol called "FCP (function control protocol) common to AV/C protocols.

Also, each of the nodes (units) connected to each other via the IEEE 1394 serial bus can freely be a data source or destination and connected in the broadcast-to-broadcast manner on the serial bus, and a point-to-point connection and one-to-broadcast connection can be established for transfer of print data.

A printer operative according to the AV/C printing protocol featured as mentioned above can be compatible with a broadcast-to-broadcast connection in an environment in which may AV units and PCs are connected to the IEEE 1394 serial bus.

With regard to transmitting of print data and printing control commands according to the AV/C printing protocol, however, there have only been defined sRGB data of raw type and image files such as TIFF, JPEG, Exif, etc. as types of print data.

Therefore, currently, in the printing work according to the conventional AV/C printing protocol, the print data transmitter cannot designate any type of print data by the page-description language. Also, even when the printer side receives print data but if the latter is described in a page-description language not supported by the printer side, it cannot be printed. This problem will take place more frequently when many units of different types are connected to the IEEE 1394 serial bus.

OBJECT AND SUMMARY OF THE INVENTION

It is therefore an object of the present invention to overcome the above-mentioned drawbacks of the prior art by providing a data converting apparatus and method, printing apparatus and method, printing controlling apparatus and method, printing system and method and a data transmitting method, in which many controllers of different types connected to a single bus enable a printer to print data.

The above object can be attained by providing a data converter for converting print data transmitted from a printing control unit to a printing unit via a serial bus, the apparatus including according to the present invention a judging means for detecting print data specifying information included in a print data transmitting command supplied from the printing control unit, and judging, based on the detected print data specifying information, the type of the print data transmitted from the printing control unit; and a conversion controlling means for converting, according to the result of the judgment made by the judging means, the print data transmitted from the printing control unit to the printing unit to print data of a type supported by the printing unit, and outputting the converted print data to the printing unit.

Also the above object can be attained by providing a data converting method for converting print data transmitted from a printing control unit to a printing unit via a serial bus, the method including according to the present invention a fist step of inputting, from the printing control unit, a print data transmitting command informing that the print data is going to be transmitted from the printing control unit to the printing unit, a second step of detecting print data specifying information included in the supplied print data transmitting command, a third step of judging, based on detected print data specifying information, the type of the print data transmitted from the printing control unit, a fourth step of converting, according to the result of the judgment effected in the third step, the print data transmitted from the printing control unit to print data of a type supported by the printing unit, and a fifth step of outputting the converted print data to the printing unit.

Also the above object can be attained by providing a printer including according to the present invention, a printing means for making a printing work by the use of print data, an input/output means to which the print data and a control command are supplied from a printing control unit via a serial bus, a judging means for detecting print data specifying information included in a print data transmitting command supplied to the input/output means and judging, based on the detected print data specifying information, the type of the print data transmitted from the printing control unit, means for converting, according to the result of the judgment, the supplied print data to print data of a type supported by the printing means, and means for controlling the printing means to make a printing work by the use of the converted print data from the converting means.

Also the above object can be attained by providing a printing method including according to the present invention, a first step of detecting print data specifying information included in a print data transmitting command transmitted from a printing control unit via a serial bus and judging, based on the detected print data specifying information, the type of the print data transmitted from the printing control unit, a second step of inputting the print data from the printing control unit via the serial bus and converting, according to the result of the judgment, the supplied print data to print data of a type supported by a printing unit, and a third step of making a printing work by the printing unit by the use of the converted print data.

Also the above object can be attained by providing a printing control unit including according to the present invention, means for generating print data for use by a printing unit connected via a serial bus to make a printing work, an input/output means for outputting a control command to control the printing unit and the print data to the printing unit via the serial bus, means for generating a print data transmitting command including print data specifying information indicative of the type of the print data transmitted to the printing unit, and means for controlling the input/output means to output to the printing unit print data of a type indicated by the print data specifying information included in the print data transmitting command generated by the command generating means.

Also the above object can be attained by providing a printing controlling method in which data to be printed by a printing unit connected via a serial bus is outputted to the printing unit which is thus allowed to make a printing work, the method including according to the present invention, a first step of generating a print data transmitting command including print data specifying information indicative of the type of the print data transmitted to the printing unit and outputting it to the printing unit, and a second step of transmitting, to the printing unit, print data of a type indicated by the print data specifying included in the print data transmitting command.

Also the above object can be attained by providing a printing system including according to the present invention, a printing control unit including means for generating data to be printed by a printing unit connected via a serial bus, first input/output means for outputting a control command to control the printing unit and the print data to the printing unit via the serial bus, and means for generating a print data transmitting command including print data specifying information indicative of the type of the print data transmitted to the printing unit, the printing unit including a second input/output supplied with the print data and control command from the printing control unit, and means for making a printing work by the use of the print data supplied from the printing control unit via the second input/output means.

In the above printing system, the printing control unit controls the first input/output means to output to the printing unit the print data transmitting command generated by the command generating means, the printing unit detects the print data specifying information included in the print data transmitting command supplied from the second input/output means via the serial bus, judges, based on the detected print data specifying information, the type of the print data transmitted from the printing control unit, and converts, according to the result of the judgment, the print data transmitted from the printing control unit to print data of a type supported by the printing means.

Also the above object can be attained by providing a printing method in which print data is transmitted via a serial bus from a printing control unit to a printing unit which is thus allowed to print the print data, the method including, according to the present invention, steps of generating a print data transmitting command including print data specifying information indicative of the type of the print data and outputting it from the printing control unit to the printing unit, detecting the print data specifying information included in the print data transmitting command transmitted from the printing control unit to the printing unit and judging the type of the print data transmitted from the printing control unit, inputting the print data transmitted from the printing control unit via the serial bus to the printing unit, converting, according to the result of the judgment, the supplied print data to print data of a type supported by the printing unit and making a printing work at the printing unit by the use of the converted print data.

Also the above object can be attained by providing a printing system including according to the present invention a printing control unit including means for generating data to be printed by a printing unit connected via a serial bus, a first input/output means for outputting a control command to control the printing unit which makes a printing work by the use of the print data generated by the print data generating means, and the print data to the printing unit and means for generating a print data transmitting command including print data specifying information indicative of the type of the print data transmitted to the printing unit, and the printing unit including a second input/output means connected to the serial bus and to which the print data and control command are supplied from the printing control unit and means for making a printing work by the use of the print data supplied from the printing control unit via the second input/output means.

In the above printing system, the printing control unit controls the first input/output means to transmit the print data transmitting command generated by the command generating means to the printing unit, the printing unit judges the type of the print data indicated by the print data specifying information included in the print data transmitting command and outputs to the printing control unit the result of the judgment indicating whether the type of the print data, indicated by the print data specifying information, is supported by the printing means for making a printing work, and the printing control unit outputs, based on the result of the judgment from the printing unit, print data of a type supported by the printing means to the printing unit.

Also the above object can be attained by providing a printing method in which print data is transmitted from a printing control unit to a printing unit via a serial bus and printed by the printing unit, the method including, according to the present invention, steps of generating a print data transmitting command including print data specifying information indicative of the type of the print data and outputting it from the printing control unit to the printing unit, detecting the print data specifying information included in the print data transmitting command transmitted from the printing control unit to the printing unit, judging the type of the print data transmitted from the printing control unit, outputting the result of the judgment, indicating whether the type of the print data, indicated by the print data specifying information, is supported by the printing unit; and outputting print data of a type supported by the printing unit from the printing control unit to the printing unit.

Also the above object can be attained by providing a printing system including according to the present invention a printing control unit including a print data generating means for generating data to be printed by a printing unit connected to the print data generating means via a serial bus, a first input/output means outputting a control command to control the printing unit which makes a printing work by the use of the print data generated by the print data generating means, and the print data to the printing unit and means for generating a print data transmitting command including print data specifying information indicative of the type of the print data; and a data converting block including means for detecting the print data specifying information included in the print data transmitting command supplied from the printing control unit and judging, based on the detected print data specifying information, the type of the print data transmitted from the printing control unit means for converting, according to the result of the judgment by the judging means, the print data transmitted from the printing control unit to print data of a type supported by the printing unit, and outputting the converted print data to the printing unit; and the printing unit including a third input/output means supplied with the converted print data and print data transmitting command from the data converting block and means for making a printing work by the use of the converted print data supplied from the third input/output means.

Also the above object can be attained by providing a printing method in which print data is transmitted from a printing control unit to a printing unit via a serial bus for printing by the printing unit, the method including, according to the present invention, steps of generating a print data transmitting command including print data specifying information indicative of the type of the print data and outputting the command from the printing control unit a data converting block, detecting the print data specifying information included in the print data transmitting command transmitted from the printing control unit to the data converting block, judging the type of the print data transmitted from the printing control unit, transmitting the print data from the printing control unit to the data converting block, converting, according to the result of the judgment, the supplied print data to print data of a type supported by the printing unit, outputting the converted print data from the data converting block to the printing unit and making a printing work at the printing unit by the use of the converted print data from the data converting block.

Also the above objected can be attained by providing a data transmitting method in which print data is transmitted from a printing control unit to a printing unit via a serial bus, the method including, according to the present invention, steps of generating, at the printing control unit, a print data transmitting command including print data specifying information indicative of the type of the print data and transmitting the command from the printing control unit to the printing unit, judging, at the printing control unit, whether the print data of the type indicated by the print data specifying information can be printed or not, based on the response of the printing unit to the print data transmitting command and deciding, at the printing control unit, when it has been judged that the print data of the type designated with the initially designated print data specifying information cannot be printed, to include, into the data transmitting command, print data identification information different from the initially designated one and output the different data transmitting command again to the printing unit, or deciding, when it has been judged that the print data of the type designated with the initially designated print data specifying information can be printed, to transmit the print data of the designated type to the printing unit.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 6 shows the data structure of an operation mode command;

FIG. 7 explains the content of operation_mode_parameters included in the operation mode command;

FIG. 8 shows the data structure of a capture command;

FIG. 9 explains the value of print data specifying information included in the capture command;

FIG. 10 also explains the value of print data specifying information included in the capture command;

FIG. 11 also explains the value of print data specifying information included in the capture command;

FIG. 12 also explains the value of print data specifying information included in the capture command;

DETAILED DESCRIPTION OF THE PREFERRED EMBODIMENTS

Figure 1:
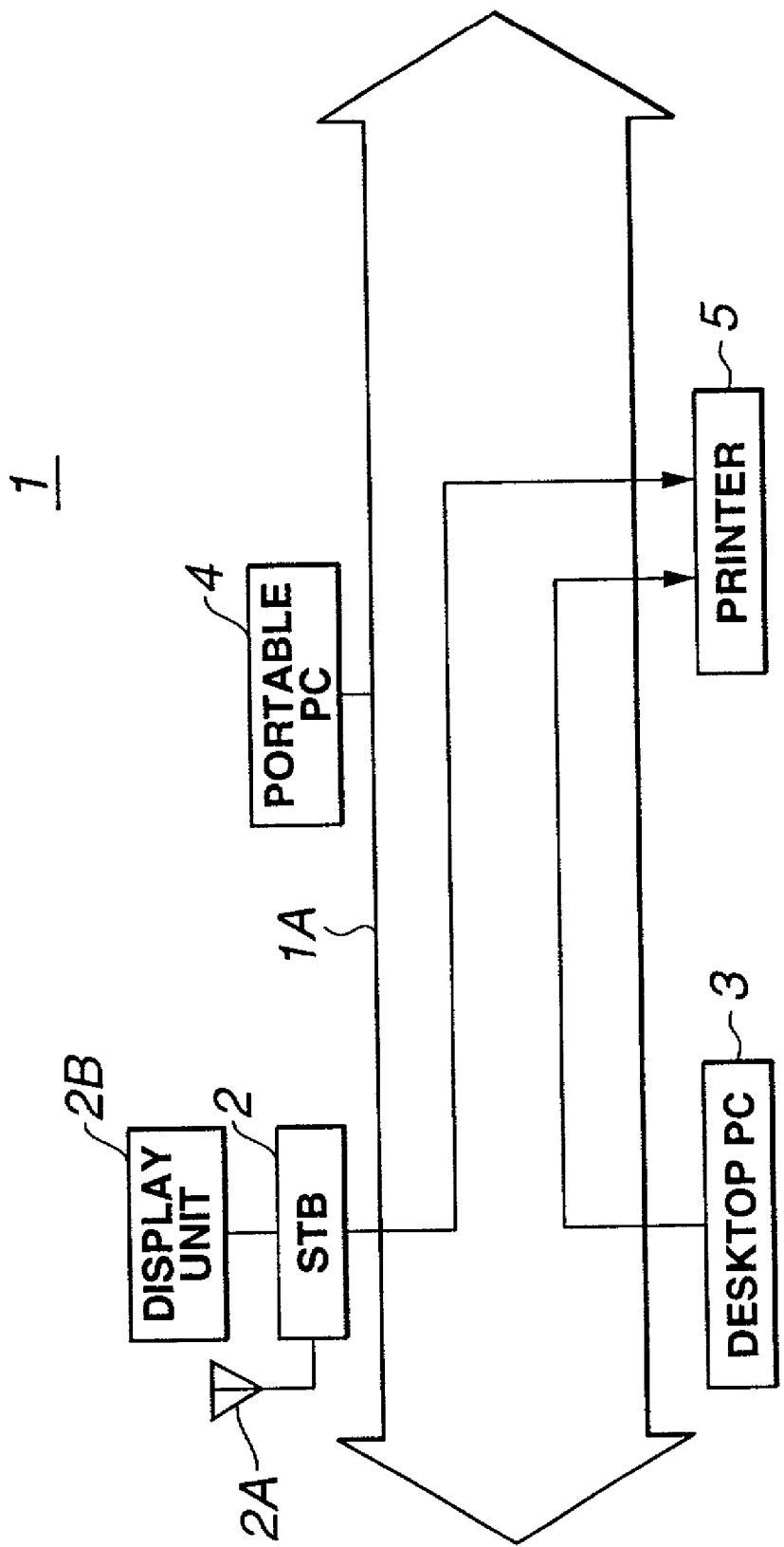
FIG. 1 is a block diagram of the printing system according to the present invention, schematically illustrating the construction of the printing system.

Referring now to FIG. 1, there is schematically illustrated in the form of a block diagram a printing system according to the present invention. The printing system is generally indicated with a reference 1.

As shown in FIG. 1, the printing system 1 includes an IEEE 1394 serial bus 1A, and a set top box (STB) 2, desktop personal computer (PC) 3, portable PC 4 and AV/C printer 5, all connected to the serial bus 1A.

In the printing system 1, the desktop PC 3 and STB 2 are provided as a print data transmitting unit to transmit print data to the AV/C printer 5. The print data transmitted from the STB 2 or desktop PC 3 is received by the AV/C printer 5 which makes a printing work using the supplied print data. A point-to-point connection can be established between the desktop PC 3 and AV/C printer 5 and between the STB 2 and AV/C printer 5 via the IEEE 1394 serial bus 1A, and a control command and print data can be transmitted via the serial bus 1A from the STB 2 or desktop PC 3 to the AV/C printer 5.

Figure 2:
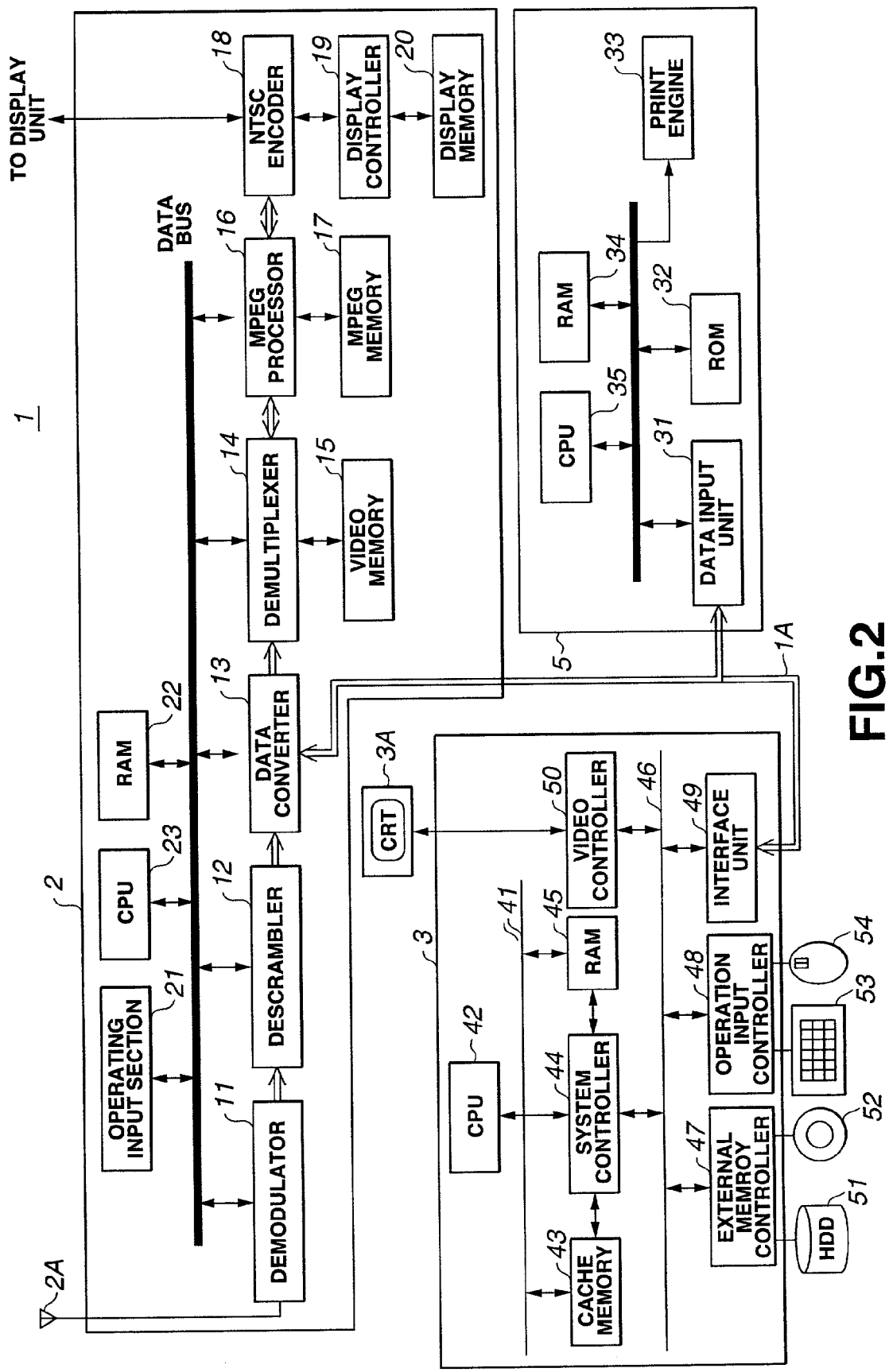
FIG. 2 is a block diagram of a STB (set top box), desktop PC (personal computer) and AV/C printer forming together the printing system according to the present invention.

As shown in FIG. 2, the STB 2 includes a demodulator 11 to demodulate a video signal received by an antenna 2A, descrambler 12 to decrypt moving picture data, data output unit 13 to make a data conversion etc. conforming to the IEEE 1394 standard, demultiplexer 14 to extract moving picture data on a predetermined channel, moving picture memory 15, MPEG processor 16 to make a decoding etc., MPEG memory 17, NTSC encoder 18 to convert data for display on a display unit 2B, display controller 19, display memory 20, operation input unit 21 by which the user enters his command, RAM (random access memory) 22, and a CPU (central processing unit) 23 to control each of these components.

In the STB 2, the demodulator 11, descrambler 12, data output unit 13, demultiplexer 14, MPEG processor 16, operation input unit 21, RAM 22 and CPU 23 are connected to the serial bus 1A and they operate under the control of the CPU 23 via the serial bus 1A.

The demodulator 11 is supplied with an analog video signal indicating a moving picture stream for example from the antenna 2A. The demodulator 11 demodulates the analog video signal from the antenna 2A and converts the demodulated video signal to digital moving picture data, and outputs the digital moving picture data to the descrambler 12. Note that the demodulator 11 is supplied with a control signal from the CPU 23 via the serial bus 1A, and it makes the demodulation and A/D conversion based on the control signal.

The descrambler 12 decrypts a moving picture data from the demodulator 11. Namely, the descrambler 12 is supplied with an encrypted moving picture data, and decrypts the moving picture data according to a method by which the supplied moving picture data has been encrypted. The descrambler 12 outputs the decrypted moving picture data to the data output unit 13. Note that the descrambler 12 is supplied with a control signal from the CPU 23 via the serial bus 1A, and it makes the data decryption using encryption key information for example included in the supplied control signal.

The data output unit 13 is formed from an interface circuit conforming to the IEEE 1394 for example, and establishes an asynchronous or isochronous connection with the AV/C printer 5 according to a control signal from the CPU 23.

When transmitting temporally continuous data such as moving picture data, the data output unit 13 establishes an isochronous connection with the AV/C printer 5 on the IEEE 1394 serial bus 1A to generate isochronous packets. Capturing the isochronous data, the AV/C printer 5 makes a printing work.

On the other hand, when transmitting static data such as screen data (print data), AV/C (AV/C digital interface command set), etc. to be printed by the AV/C printer 5, the data output unit 13 establishes an asynchronous connection on the IEEE 1394 serial bus 1A to generate asynchronous packets.

For outputting the isochronous packets to the IEEE 1394 serial bus 1A while the isochronous connection is being established, the data output unit 13 transmits the packets at regular intervals.

Figure 3:
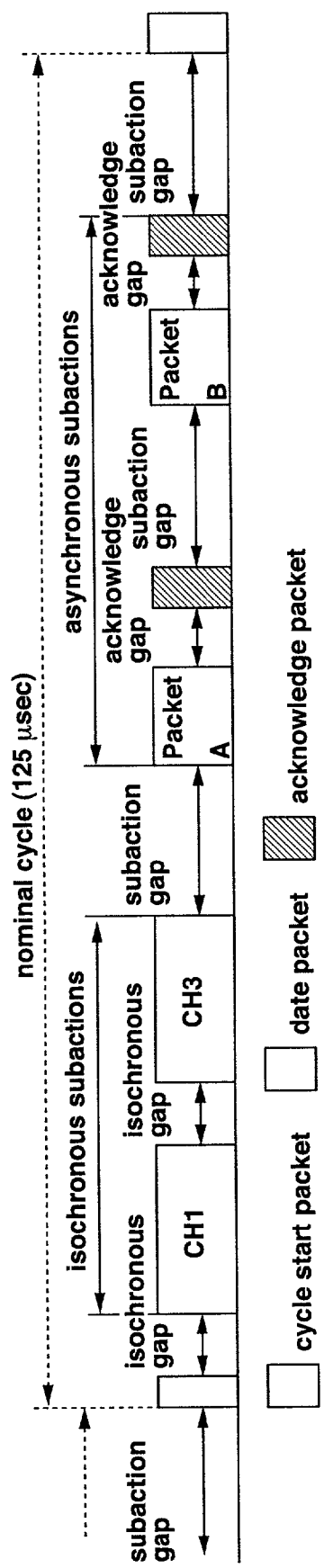
FIG. 3 explains a method for transmitting a mixture of isochronous and asynchronous packets via an IEEE 1394 serial bus.

The isochronous communication and asynchronous communication can be compatible with each other. In this case, using 100 sec of one cycle of 125 sec for the isochronous connection and the rest for the asynchronous connection as shown in FIG. 3, the data output unit 13 always start the isochronous connection before the asynchronous connection, thereby assuring the isochronous connection. Thus the data output unit 13 transmits the isochronous and asynchronous packets to the AV/C printer 5.

As shown in FIG. 3, the data output unit 13 will first transmit a cycle start packet 111 indicative of a Cycle_start transmitted from a cycle master (not shown) to inform the start of the cycle. After elapse of a n isochronous gap of a predetermined length of time, the data output unit 13 transmits a command packet including a capture command informing that print data is going to be transmitted and a data packet including the print data at each cyclic period. Note that the data output unit 13 first transmits an isochronous packet and then transmits an asynchronous packet after elapse of a subaction gap.

For displaying the moving picture data received by the STB 2 as it is on the display unit 2B, the data output unit 13 outputs the moving picture data from the descrambler 12 to the demultiplexer 14 based on a control signal supplied from the CPU 23.

The demultiplexer 14 selects a channel designated by the CPU 23 from a plurality of channels superposed on the moving picture data from the data output unit 13, and outputs only moving picture data indicative of the designated channel to the PEG processor 16.

Also the demultiplexer 14 is supplied with print data from the MPEG processor 16 under the control of the CPU 23, stores it in to the video memory 15, and outputs it to the data output unit 13 under the control of the CPU 23.

The MPEG processor 16 decodes, based on a control signal from the CPU 23, the moving picture data from the demultiplexer 14 according to the MPEG standard, and outputs it as a non-compressed moving picture data to the NTSC encoder 18. The MPEG processor 16 uses the MPEG memory 17 as a work area while storing, into the MPEG memory 17 whenever necessary, the moving picture data in units of a plurality of frames to be decoded.

Also, the MPEG processor 16 compresses the moving picture data in the time-base and spatial directions by encoding the moving picture data from the NTSC encoder 18 according to the MPEG standard on the basis of a control signal indicative of a compression rate from the CPU 23, and outputs the compressed moving picture data to the demultiplexer 14. At this time, the MPEG processor 16 stores, into the MPEG memory 17, the moving picture data in units of a plurality of frames to be encoded.

The NTSC encoder 18 encodes the moving picture data supplied from the MPEG processor 16 to moving picture data of an NTSC type displayable on the display unit 2B, and outputs the NTSC type moving picture data to the display unit 2B.

The display controller 19 processes the NTSC type moving picture data from the NTSC encoder 18 for display on the display unit 2B. At this time, the display controller 19 stores the data to be processed into the display memory 20 whenever necessary.

The operation input unit 21 generates an operation input signal and outputs it to the CPU 23 through operation by the user of control buttons etc. for example provided on the STB 2. More particularly, the operation input unit 21 bring to a temporary halt display of a moving picture being displayed on the display unit 2B by the user for example, and generates an operation input signal informing that the print data is going to be printed by the AV/C printer 5.

The CPU 23 generates, based on the operation input signal from the operation input unit 21 for example, a control signal for use to control each of the components of the STB 2.

When displaying for example a video signal received by the antenna 2A on the display unit 2B, the CPU 23 outputs a control signal to each of the demodulator 11, descrambler 12, data output unit 13, demultiplexer 14 and MPEG processor 16 to allow these components effect to modulate the moving picture data, decrypt the modulated data, select a channel, and decode the data according to the MPEG standard, respectively.

Also, when acquiring still image data, in units of a frame, of the moving picture displayed on the display unit 2B based on the operation input signal from the operation input unit 21, the CPU 23 generates a control signal for instructing to write into the video memory 15 still image data in units of a frame, stored in the display memory 20, at a time when the operation input signal has been supplied.

Further, when an operation input signal informing that the still image data is going to be printed by the AV/C printer 5, the CPU 23 works as an AV/C printer subunit while serving as a controller and source device in the IEEE 1394 AV/C protocol.

When supplied with an operation input signal informing that an image from which the still image data has been produced is going to be printed by the AV/C printer 5, the CPU 23 controls each of the above-mentioned components to freeze an image being displayed on the display unit 2B, and also controls the data output unit 13 read the still image data indicating the frozen image out of the display memory 20, supply it to the video memory 15, append a header conforming to the IEEE 1394 standard to the still image data stored in the video memory 15, include the still image data as video data into the asynchronous packet, and output the packet to the IEEE 1394 serial bus 1A.

Also, the CPU 23 controls the data output unit 13 to establish an asynchronous connection with the AV/C printer 5 via the IEEE 1394 serial bus 1A. The CPU 23 will control the AV/C printer 5 to acquire a channel and frequency band in the IEEE 1394 serial bus 1A and set a plug/port for transmitting print data, and also controls the data output unit 13 to establish the asynchronous connection with the AV/C printer 5.

During the asynchronous connection established on the IEEE 1394 serial bus 1A, the data output unit 13 transmits a capture command of a data transmitting command being an AV/C command to the AV/C printer 5. At this time, the data output unit 13 includes, according to a control signal from the CPU 23, print data type information indicative of the type of the print data into the capture command, and transmits the capture command.

The print data type information includes types of screen data, and types of a page-description language of the print data corresponding to the manufacturer, model and type of the AV/C printer 5.

For allowing the AV/C printer 5 to effect a printing work, the STB 2 constructed as in the above works as a controller or source device in the IEEE 1394 AV/C protocol to control the AV/C printer 5.

As shown in FIG. 2, the desktop PC 3 includes a CPU bus 41 to which a CPU 42, cache memory 43, system controller 44 and a RAM 45 are connected, and a system bus 46 to which an external memory controller 47, operation input controller 48, interface unit 49 and a video controller 50 are connected.

The desktop PC 3 also includes a HDD unit 51 and a disc drive 52, which store data, connected to the external memory controller 47, and a keyboard 53 and mouse 54, which are to be operated by the user. The keyboard 53 and mouse 54 are connected to the operation input controller 48. The desktop PC 3 further includes a CRT display unit 3A connected to the video controller 50.

In the desktop PC 3, when displaying video data stored in the HDD 51 or disc drive 52 on the CRT display unit 3A, the CPU 42 will control, according to an operation input signal generated by the operation input controller 48 as the user operates the keyboard 53 or mouse 54, the external memory controller 47 to output the data stored in the HDD 51 or disc drive 52 to the video controller 50. The video controller 50 converts data supplied from the external memory controller 47 via the system bus 46 to display data, and outputs it to the CRT display unit 3A which is thus allowed to display the display data thereon.

Also, in the desktop PC 3, the interface unit 49 and IEEE 1394 serial bus 1A are connected to each other, and a point-to-point connection is established between the interface unit 49 and the data input unit 31 of the AV/C printer 5 on the IEEE 1394 serial bus 1A.

In the desktop PC 3 constructed as in the above, when having the AV/C printer 5 print an image being displayed on the CRT display unit 3A, the CPU 42 will control, according to an operation input signal from the operation input controller 48, the video controller 50 to freeze the image displayed on the CRT display unit 3A. The CPU 42 reads data indicative of the frozen image from the video controller 50, and converts the page-description language of the data to a predetermined page-description language to generate print data. At this time, the CPU 42 generate, as print data, PDL data in the predetermined page-description language using the cache memory 43 and RAM 45 connected to the CPU 42 via the CPU bus 41 as a work area.

For allowing the AV/C printer 5 to make a printing work, the desktop PC 3 serves as a controller or source device in the IEEE 1394 AV/C protocol to control the AV/C printer 5.

Next, the AV/C printer 5 will be described hereinafter.

As shown in FIG. 2, the AV/C printer 5 includes a data input unit 31 to which print data is supplied from the AV/C printer 5, ROM (read-only memory) 32 which stores a printing control program, print engine 33 which prints data on a printing medium, RAM 34, and a CPU 35 which controls each of the above components. The AV/C printer 5 serves as a sink device which makes a printing work using the print data from the STB 2 or desktop PC 3.

The data input unit 31 is formed from an interface circuit conforming to the IEEE 1394 standard for example. According to a control signal from the CPU 35, the data input unit 31 will establish a point-to-point connection with the STB 2 and desktop PC 3 via the IEEE 1394 serial bus 1A. When the data input unit 31 is connected to the STB 2 and desktop PC 3 via the IEEE 1394 serial bus 1A, it will make, between itself and the data output unit 13 of the STB 2 a plug/port setting for transfer of an asynchronous packet to and from the AV/C printer 5. Further, the data input unit 31 assures a common channel and frequency band between the STB 2 and desktop PC 3 to establish an asynchronous connection with the STB 2 and desktop PC 3 and transmit an asynchronous packet including an AV/C command and print data to the STB 2 and desktop PC 3.

Also, the data input unit 31 is supplied with an asynchronous packet including an AV/C command from the STB 2 or desktop PC 3 and outputs the AV/C command to the CPU 35.

The data input 31 interprets a header included in the asynchronous packet from the STB 2 and desktop PC 3, extracts print data, and outputs it to the CPU 35.

The print engine 33 consists of a printing medium holding/driving mechanism, printer head, printer head driving mechanism, etc., and is controlled by the CPU 35 to print a still image on the printing medium.

The CPU 35 generates control signals with which the data input unit 31 and print engine 33 are controlled, respectively. The CPU 35 operates in accordance with a printing control program stored in the ROM 32, and controls the content of the RAM 34 as a work area. The CPU 35 processes the data according to the printing control program to effect a data type conversion and raster processing using the print data received by the data input unit 31.

In the AV/C printer 5 constructed as in the above, the data input unit 31, CPU 35, print engine 33, etc. works as a target or sink device in the IEEE 1394 AV/C protocol, and serves as an AV/C printer subunit. The AV/C printer subunit receives the print data from the STB 2 or desktop PC 3 and makes a printing work. At this time, the AV/C printer subunit is supplied with the print data from the STB 2 and also with PDL data of the page-description language from the desktop PC 3.

Further, the AV/C printer subunit has a function to interpret the type of transmitted print data based on print data specifying information included in a capture command received via the IEEE 1394 serial bus 1A. When the type of the transmitted PDL data is different from that of a PDL data to be processed according to the printing control program, the AV/C printer subunit converts the PDL data to the PDL data supported by the printing control program, and the converted PDL data is printed by the print engine 33.

More particularly, in the printing system 1, when the page-description language of the PDL data transmitted from the desktop PC 3 to the AV/C printer subunit is not any page-description language which can be interpreted by the AV/C printer subunit, the AV/C printer subunit will interpret the page-description language of the received PDL data by referring to print data specifying information included in the capture command, and convert it to a page-description language which can be interpreted by the AV/C printer subunit.

For example in case the AV/C printer subunit can interpret LIPS alone, when the print data is transmitted after a capture command designating the print data specifying information as PostScript is transmitted, the AV/C printer subunit will convert the print data in PostScript to print data in LIPS. At this time, the AV/C printer subunit will use the Ghostscript software from Aladdin Enterprises for example as a software for conversion of the print data in Postscript to print data in LIPS.

Further, in case the AV/C printer subunit can interpret TIFF-FAX alone, when print data in PCL5 is transmitted, the AV/C printer subunit will use he EP/FAX converter from Lincoln & Co. (USA) or Nartec (Japan) as the above conversion software.

Figures 4, 5:
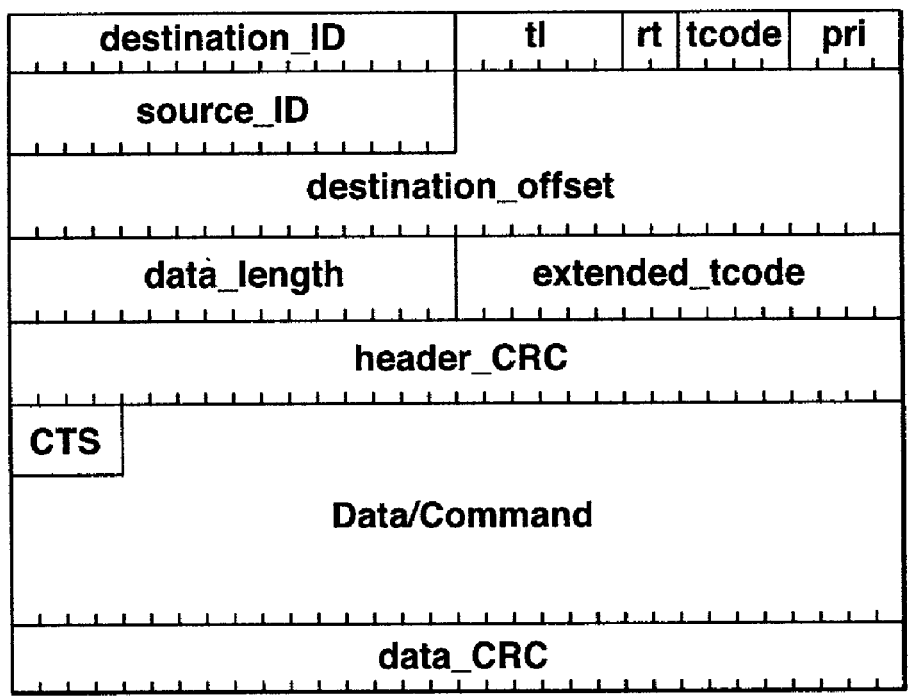
FIG. 4 shows the data structure of an asynchronous packet transmitted via the IEEE 1394 serial bus.
FIG. 5 shows the data structure of the data part of an asynchronous packet transmitted via the IEEE 1394 serial bus.

FIG. 4 shows the data structure of an asynchronous packet transmitted between STB 2 and desktop PC 3 and AV/C printer subunit. The asynchronous packet has a header part and data part conforming to the IEEE 1394 standard.

As shown, the header part includes an ID of the data destination, that is, of the AV/C printer subunit (destination_ID), transaction label (tl), retry code (rt), transaction code (tcode), priority (pri), ID of the data source, that is, of the STB 2 or desktop PC 3 (source_ID), memory address at the data destination (destination_offset), data field length (data_length), extended transaction code (extended_tcode), and a CRC of header field (header_CRC).

The data part includes a data field in which data according to FCP (function control protocol) and AV/C printing protocol, and a data CRC for the header part (data_CRC).

As shown in FIG. 5, the data field includes, as information according to FCP, a command transaction set (CTS), command type (ctype), a subunit type indicating the type of the data destination subunit (subunit_type) and a subunit ID indicating the ID of the data destination subunit (subunit_ID). When the data destination subunit is the AV/C printer subunit, the subunit_type is represented by "00010".

The data field includes, following the subunit_ID, an operation code indicating the type of an operation (opcode) and operands [0] to [n], print data (data) to be transmitted to the AV/C printer subunit, and an AV/C command (command) for the AV/C printer subunit. The command included in the data field is a one included in the command set called "AV/C command" with which the AV/C printer subunit is controlled. When a packet to be transmitted is a command for example as known from the classification in type of the FCP, a value "0000" of the CTS indicates that an AV/C command defined by the IEEE 1394 AV/C digital interface command set is included in the data field of the data part.

Next, there will be described below with reference to FIG. 6 an operation mode command to be transmitted from the STB 2 or desktop PC 3 to the AV/C printer subunit when the operation work of the AV/C printer subunit is set at the STB 2.

As shown in FIG. 6, the operation code command includes, as an operation code (opcode), information indicating an operation mode represented by a hexadecimal number "41". The information indicating an operation mode is followed by an operand [0] being "reserved". The operand [1] includes operation status information (status), operand [2] includes picture number information (next_pic), operands [3] and [4] include page number information (next_page), operands [5] to [16] include print execution request ID information (print_job_ID), operands [17] to [24] include operation mode parameter information (operation_mode_parameters), operands [25] to [29] include optionally added operation mode parameter information (operation_mode_optional_parameters), and operands [30] to [32] are "reserved". The STB 2 or desktop PC 3 controls an operation to meet the operation mode command to the AV/C printer subunit by changing the content of the command type (ctype) as shown in FIG. 5.

As shown in FIG. 7, the operation mode parameter information (operation_mode_parameters) includes printing paper type information (media_type), printing paper size information (media_size), reserved area (reserved), printing quality information (print_quality), printing color information (mono_color), printing offset position information (offset) and layout setting information (layout_type).

The STB 2 or desktop PC 3 inquires as to what a content for which an operation mode of the AV/C printer subunit can be set is, and determines an operation mode of the AV/C printer subunit by changing the value included as a command type (ctype).

Next, a capture command packet generated by the STB 2 or desktop PC 3 and transmitted to the AV/C printer subunit will be describe hereinafter with reference to FIG. 8.

The capture command packet includes a capture command (capture) represented by a hexadecimal number "42" as an opcode (operation code). The capture command is followed by subfunction information (subfunction) as an operand [0].

As shown in FIG. 8, the operand [1] includes source subunit type information (source_subunit_type) at upper 5 bits and source subunit ID information (source_subunit_ID) at lower 3 bits, operand [2] includes source plug information (source_pulg), operand [3] includes operation status information (status), and the operand [4] includes destination plug information (dest_plug). Next, the operands [5] to [16] include print execution request ID information (print_job_ID), operands [17] to [20] include data size information (data_size), operands [21] and [22] include image size information (image_size_x), operands [23] and [24] include image size information (image_size_y), operands [25] and [26] include print data specifying information (image_format_specifier), operands [27] to [29] are "reserved", operand [30] includes picture number information indicating the number for a picture to be printed (next_pic), and the operands [31] and [32] include page number information indicating a page number to be printed (next_page). In the printing system 1, the term "job" means what is done in the data transmitting and printing, and consists of at least one page. The term "page" means a unit of operation included in a print execution request and effected with respect to one printing medium (for example, printing paper) in response to the print execution request, and includes at least one picture. Also, the term "picture" means a unit of operation included in a page and effected with respect to divisions of page, namely, one pattern included in a printing medium.

The source subunit type information (source_subunit_type) indicates the type of a subunit at the STB 2 and desktop PC 3, which transmits an asynchronous packet, source subunit ID information (source_subunit_ID) is the ID of a subunit which transmits an asynchronous packet, the source plug information (source_pulg) indicates the plug number of a subunit which transmits an asynchronous packet, the destination plug information (dest_plug) indicates he plug number of the AV/C subunit which receives the asynchronous packet, the print execution request ID information (print_job_ID) is the ID of an operation (job) of printing one still image, the data size information (data_size) indicates the size of data transmitted from the STB 2 and desktop PC 3 to the AV/C printer subunit when the AV/C printer subunit prints a still image, the image size information (image_size_x) indicates the number of pixels in the x-direction, the image size information (image_size_y) indicates the number of pixels in the y-direction, and the print data specifying information (image_format_specifier) indicates the name of an image type. Also, the "reserved" area is composed of an arbitrary number of bits and provided to set the number of bits in an entire capture command to a multiple of 4. By providing this "reserved" area, a packet transferred between the STB 2 and AV/C printer 5 can be set to have a suitable number of bits for data unit in which packets conforming to the IEEE 1394 standard are transmitted.

As shown in FIGS. 9 to 12, the print data specifying information is identified by a hexadecimal value of the name of an image format. When transmitting screen data as print data to the AV/C printer subunit, the STB 2 will include in a capture command print data specifying information of a value (MSB: $00_{16}$ to $10_{16}$) as shown in FIG. 9. When transmitting PDL data as print data to the AV/C printer subunit, the desktop PC 3 will include, in a capture command, print data specifying information of a value (MSB: $40_{16}$) as shown in FIGS. 10 to 12.

As shown in FIG. 9, "pixel" in the name of image format indicates that the screen data is transmitted in the order of pixels, and "line" indicates that the screen data is transmitted in the order of lines.

For example, a hexadecimal number "00" described at MSB of the print data specifying information (sRGB in "Meaning" column) means that print data is transmitted as RGB data to the AV/C printer subunit. Further, a hexadecimal number "00" described at MSB, and hexadecimal number "00" described at LSB (sRGB raw in "Type" column), of the print data specifying information mean that RGB data is transmitted in the order of R, G, B, R, G, B, ..., and a hexadecimal number "01" at LSB (sRGB raw, quadlet in "Type" column) means that RGB data is transmitted in the order of R, G, B, 0, R, G, B, 0, .... Namely, when a hexadecimal number "01" is described at LSB, R, G, B and 0 are transmitted as 4-byte data by transmitting the data with "0" data inserted between B and R.

A hexadecimal number "01" described at MSB (YCC raw in "Meaning" column) of the print data specifying information means that video data is transmitted as YCC data. Further, a hexadecimal number "01" described at MSB of the print data specifying information and hexadecimal number "0X" (where X is indefinite) at LSB (YCC4:2:2 raw/ pixel in "Type" column) mean that a luminance signal and chrominance signal are transmitted in a pixel format of 4:2:2 in the order of pixels, a hexadecimal number "1X" described at LSB (YCC4:2:2 raw/line in "Type" column) means that data in a pixel format of 4:2:2 is transmitted in the order of lines, a hexadecimal number "8X" described at LSB (YCC4: 2:2 raw/pixel in "Type" column) means that a luminance signal and chrominance signal are transmitted in a pixel format of 4:2:0 in the order of pixels, a hexadecimal number "9X" described at LSB (YCC4:2:0 raw/line in "Type" column) means that data in a pixel format of 4:2:0 is transmitted in the order of lines.

Also, a hexadecimal number "01" described at MSB of the print data specifying information (YCC raw in "Meaning" column) and "X0 to XC" described at LSB mean that data is transmitted with the pixel ratio set to 1.00×1.00, 1.19×1.00 or 0.89×1.00, color space (ITU-R (International Telecommunications Union-Radiocommunication Sector) to BT. 709-2, BT. 601-4 or BT. 1203 and with the transmitting order set to an order of pixels or lines. Further, hexadecimal numbers "X0" to "X4" described at LSB mean that interlaced image is transmitted, and "X8" to "XC" described at LSB mean that progressive image is transmitted. Moreover, a hexadecimal number "X0 to X2" and "X8" to "XA" described at LSB mean that data conforming to ITU-R BT. 709-2 is transmitted, hexadecimal numbers "X3" and "XB" described at LSB mean that data conforming to ITU-R BT. 601-4 is transmitted, and hexadecimal numbers "X4" and "XC" mean that data conforming to ITU-R BT. 1203 (PAL system) is transmitted.

Furthermore, a hexadecimal number "10" described at MSB of the print data specifying information (DCF Object in "Meaning" column) means that video data is transmitted in a format defined at a digital camera (DCF: Design rule for Camera Format) to the AV/C printer 5. Also, a hexadecimal number "10" described at MSB of the print data specifying information and hexadecimal number "00" described at LSB (Exif2.1 in "Type" column) mean that there is transmitted data in the Exif form of which the image part is in the JPEG form and having added thereto a header in which photographed status and conditions are recorded. Further, a hexadecimal number "01" described at LSB (JFIF (JPEG File Interplay Format) in "Type" column) meas that data in the JFIF form is transmitted, a hexadecimal number "02" described at LSB (TIFF (Tag Image File Format) in "Type" column) means that data in the TIFF form is transmitted, and a hexadecimal number "0F" described at LSB (JPEG (Joint Photographic coding Experts Group) in "Type" column) means that video data in the JPEG form is transmitted to the AV/C printer 5.

As in the image type shown in FIG. 9, the print data specifying information also includes the name of a page-description language (PDL) represented by a decimal number value (value and sub-value) but not including information on the number of pixels different from in the image type shown in FIG. 9, as shown in FIGS. 10 to 12. In this case, the number of pixels to be printed by the AV/C printer subunit may be defined by the image_size_x described at the operands [21] and [22] of the capture command and image image_size_y described at the operands [23] and [24] as shown in FIGS. 9 to 12, as data in the page-description language or by both the above.

As shown in FIGS. 10 to 12, the print data specifying information has a value thereof defined to differentiate between a page-description language corresponding to the manufacturer of the AV/C printer 5 and a one corresponding to the manufacture and model of the AV/C printer 5. The value of the print data specifying information for differentiating between page-description languages, shown in FIGS. 10 to 12, is bade on an ITEF-defined RFC 1759 printer MIB and a latest version of the printer MIB prepared by the PWG (Printer Working Group) being a program from the IEEE Industrial Standard and Technology Organization (ISTO), managing the RFC 1759 printer MIB. Note that as in the example shown in FIGS. 10 to 12, the value of the print data specifying information may have a new page-description language added thereto.

Furthermore, hexadecimal numbers "80" to "8F" described at MSB of the print data specifying information indicate that data is transmitted in other format, and further, data in a format designated by hexadecimal numbers "59" to "FF" described at LSB is transmitted.

Moreover, the print data specifying information may have set therein separately from the aforementioned examples a hexadecimal number "FE" (special meaning in "Meaning" column) described at MSB and hexadecimal numbers "00" described at LSB (unit plug defined in "Type" column) depending the STB 2, desktop PC 3 and the plug of the AV/C printer subunit and "01" (Don't care) not specifying any data format.

Figure 13:
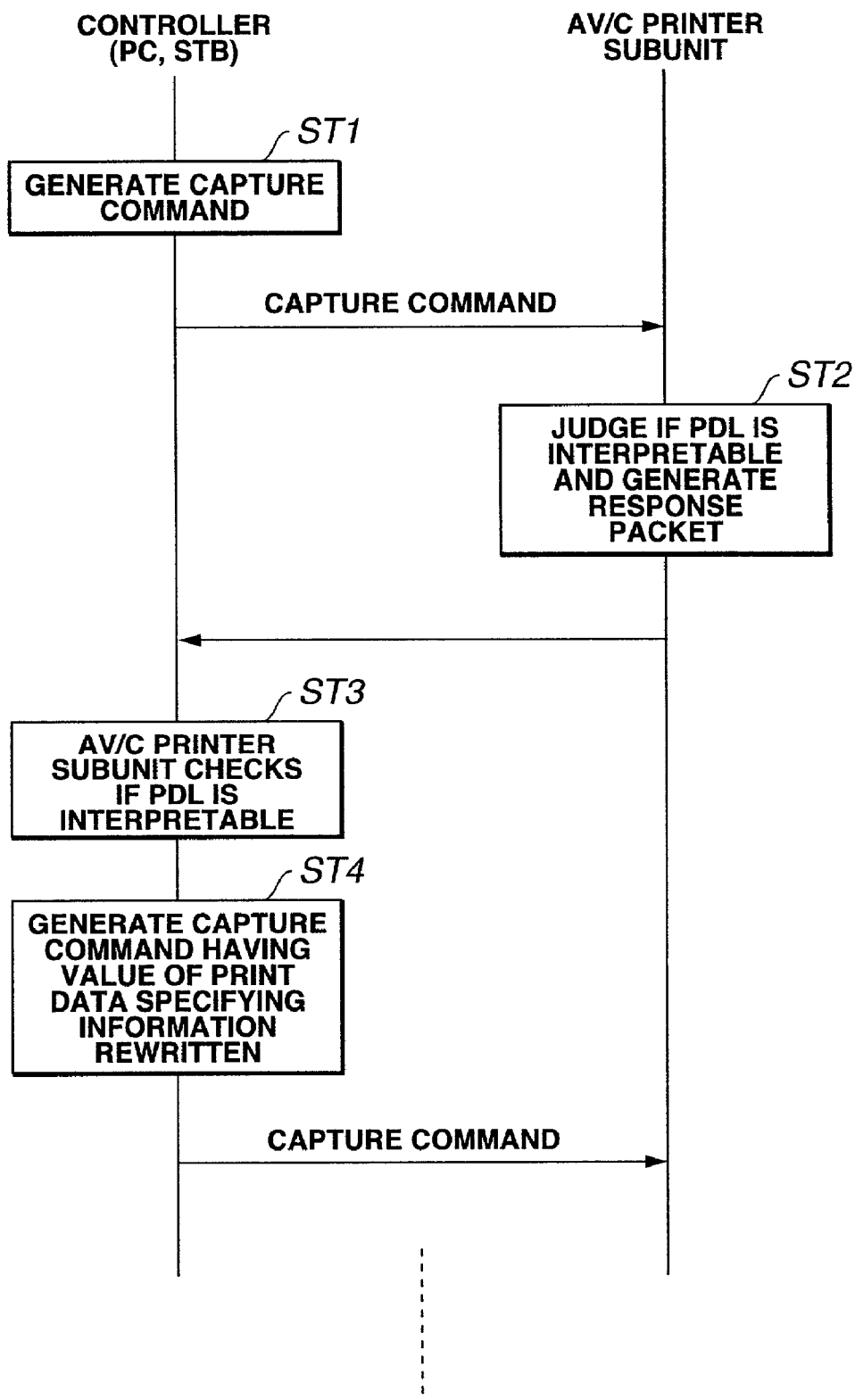
FIG. 13 is a flow chart explaining how to designate the page-description language of PDL data to be printed by an AV/C printer subunit using the capture command.

How to designate, with the above-mentioned capture command, a page-description language of PDL data to be printed by the AV/C printer subunit will be described with reference to FIG. 13.

First in the desktop PC 3, information indicating that it inquires whether the page-description language can be interpreted is taken as a command (SPECIFY INQUIRY; command type value: 0010), there is generated a capture command has included in the print data specifying information a value (see FIGS. 9 to 12) indicating a page-description language of a type to be inquired, and the capture command is transmitted to the AV/C printer 5 (at step ST1).

In the AV/C printer subunit having received the capture command, the content of the print data specifying information is interpreted to judge whether the page-description language indicated by the print data specifying information can be interpretable.

Next, the AV/C printer subunit generates a response packet having the result of the above judgment included therein and whose command type value has been rewritten, and transmits it to the desktop PC 3. When the AV/C printer subunit has judged that the page-description language is interpretable, it sets the command type value to "1100" (IMPLEMENTED). On the other hand, when the AV/C printer subunit has judged that the page-description language is not interpretable, it sets the command type value to "1011" (NOT IMPLEMENTED) (at step ST2).

Receiving the response packet, the desktop PC 3 checks the value included in the command type to judge whether the AV/C printer subunit can support the page-description language indicated by the print data specifying information (at step ST3).

The desktop PC 3 generates a capture command having been rewritten correspondingly to the page-description language inquiring the value of the print data specifying information, transmits it to the AV/C printer subunit, and interprets a response packet to the capture command. (at step ST4). By repeating these operations, the desktop PC 3 can recognize a page-description language which can be used between it and AV/C printer subunit.

In the printing system 1, a command for inquiry of the ability of units connected thereto via the IEEE 1394 serial bus 1A may be used to obtain at the desktop PC 3 a page-description language which is interpretable by the AV/C printer subunit. Thereby, the desktop PC 3 includes in a capture command print data specifying information indicating a page-description language interpretable by the AV/C printer subunit and transmits the print data to the AV/C printer 5.

Next, operations effected according to a printing control program in the AV/C printer 5 will be described below with reference to FIG. 14.

Figure 14:
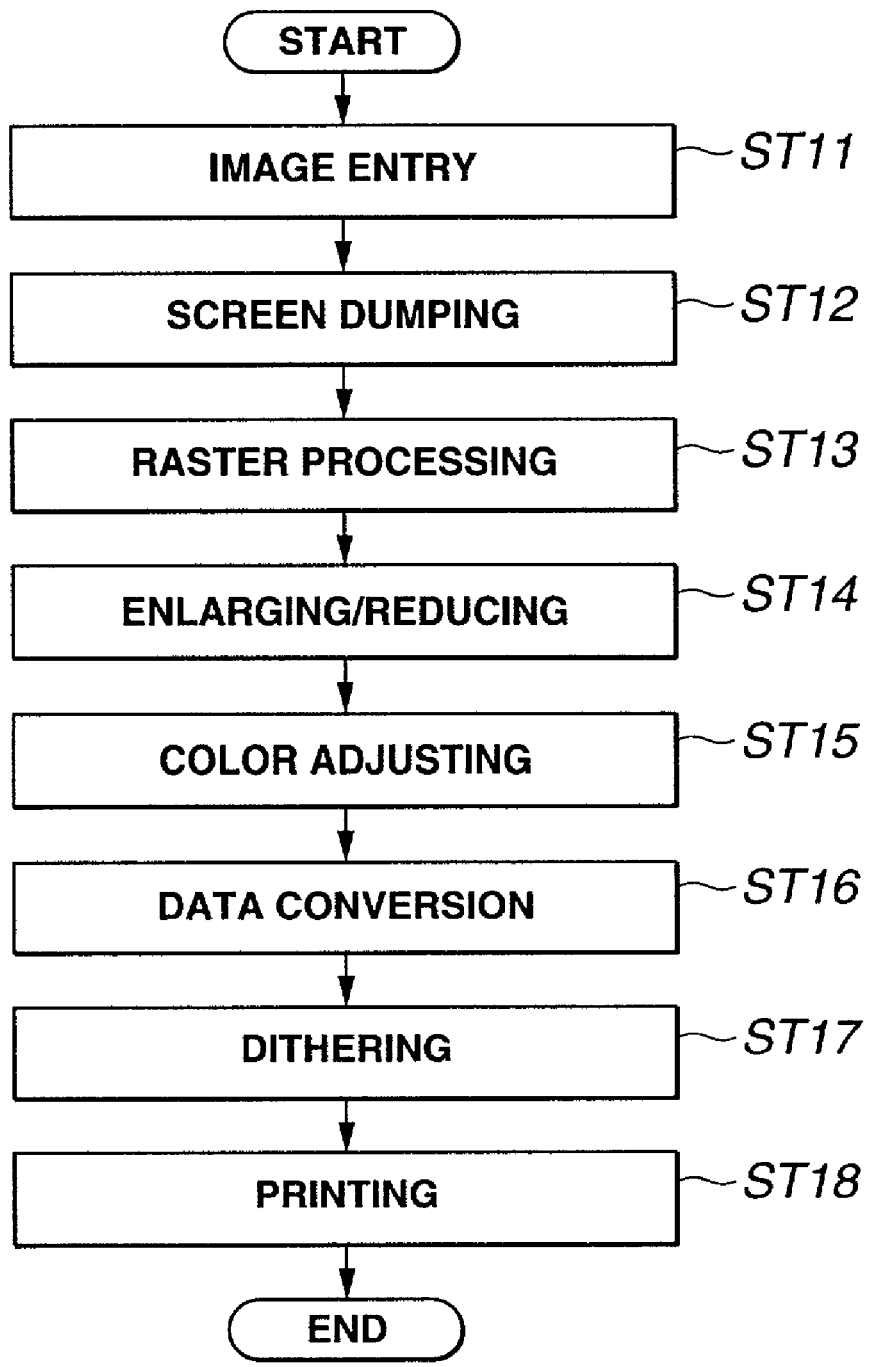
FIG. 14 is a flow chart of a printing procedure followed by an AV/C printer included in the printing system according to the present invention in making a printing work.

As shown in FIG. 14, first at step ST11, the AV/C printer subunit is supplied with a packet generated according to the IEEE 1394 standard from the STB 2 or desktop PC 3. The AV/C printer subunit extracts print data from an isochronous packet for example.

Next at step ST12, the AV/C printer subunit makes screen dumping for printing all indicated by the print data.

Next at step ST13, the AV/C printer subunit makes raster processing of the print data screen-dumped at step ST12. That is, the AV/C printer subunit converts the print data to a form of dots for transfer to the print engine 33.

Next at step ST14, the AV/C printer subunit makes enlargement/reduction of the print data raster-processed at step ST13. Namely, the AV/C printer subunit processes the print data to vary the printing size of a still image within a range designated by the user for example.

Next at step ST15, the AV/C printer subunit adjusts the color of the print data enlarged/reduced in size at step ST14.

Next at step ST16, the AV/C printer subunit converts the RGB data adjusted in color at step ST15 to cyan, magenta and yellow to determine a ratio among the cyan, magenta and yellow in each dot. Then, the AV/C printer subunit dithers the print data at step ST17.

At step ST18, the AV/C printer subunit outputs the dithered print data to the print engine 33, to thereby drive the print engine 33 to print an image on the printing medium.

There will be described below with reference to FIG. 15 operations effected in the printing system 1 for transmitting video data from the STB 2 or desktop PC3 to the AV/C printer subunit constructed as in the above and printing the video data.

Figure 15:
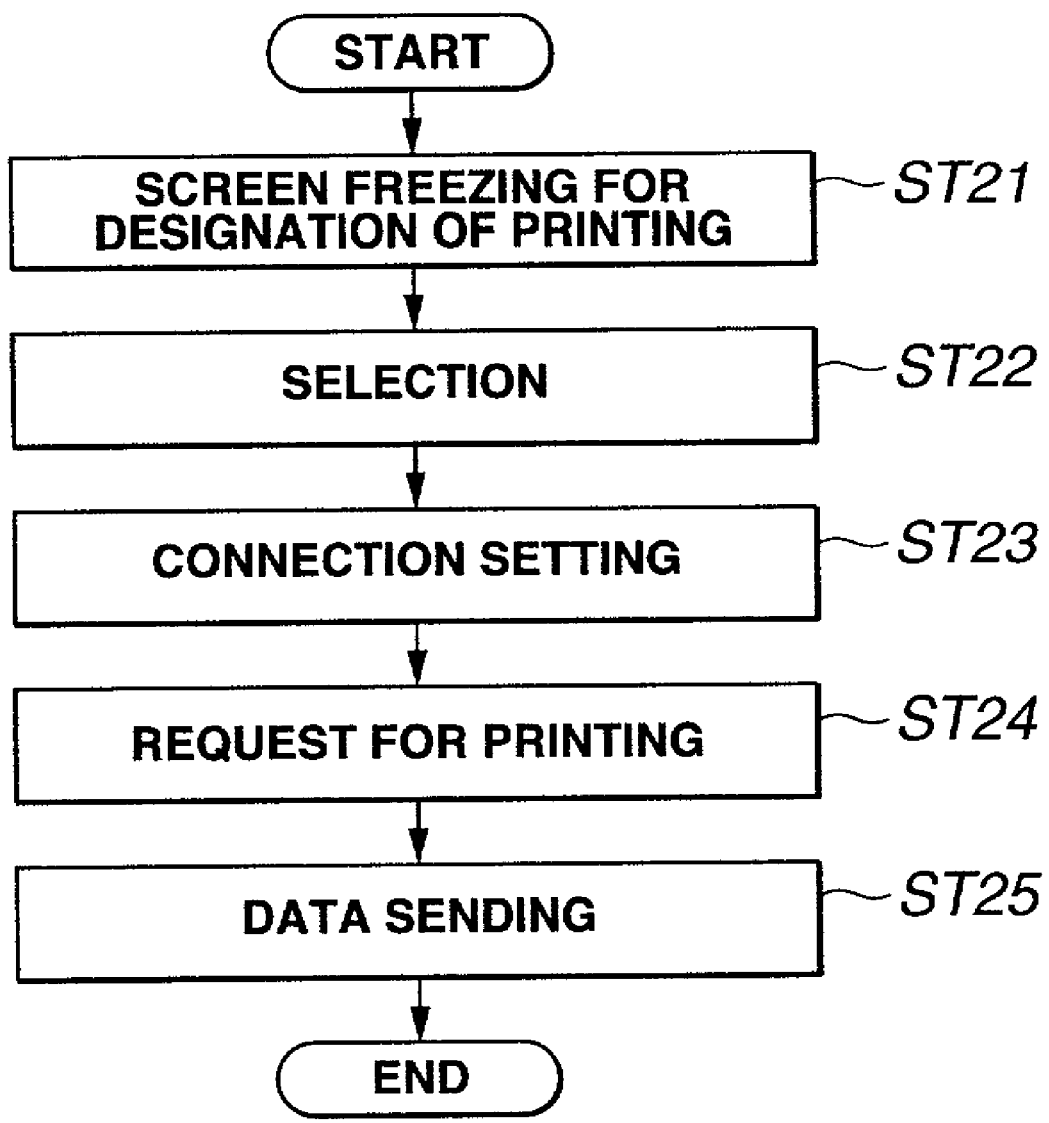
FIG. 15 is also a flow chart explaining the operations of the STB or desktop PC in making a printing work by the AV/C printer.

As shown in FIG. 15, first at step ST21, the STB 2 or desktop PC 3 freezes a moving picture according to an operation input signal.

Next at step ST22, when a still image in units of frame, frozen at step ST21 and displayed on the display unit 2B or CRT display unit 3A, is selected and printed by the AV/C printer subunit, the STB 2 or desktop PC 3 acquires the still image in units of a frame, processes screen data to be print data and converts the page-description language of the screen data to a predetermined page-description language, thereby providing print data.

Next at step ST23, the STB 2 or desktop PC 3 will establish an asynchronous connection with the AV/C printer subunit.

Next at step ST24, the STB 2 or desktop PC 3 requests the AV/C printer subunit for a printing size, printing direction, printing position, number of prints, etc. At this time, the STB 2 or desktop PC 3 outputs an operation mode command to determine an operation mode for the AV/C printer subunit according to the content of a response to the operation mode command.

Next at step ST25, the STB 2 or desktop PC 3 outputs print data to be printed by the AV/C printer subunit to the latter. The STB 2 or desktop PC 3 controls to transmit a capture command to the AV/C printer subunit and also to transmit the print data to the AV/C printer subunit.

Then, receiving a plurality of data packets including information indicative of a destination plug and port, the AV/C printer subunit judges whether it has received all data of the print data. When the AV/C printer subunit judged that all data of the print data have been received, it prints an image indicated by the print data by effecting the operations shown in FIG. 14.

Figure 16:
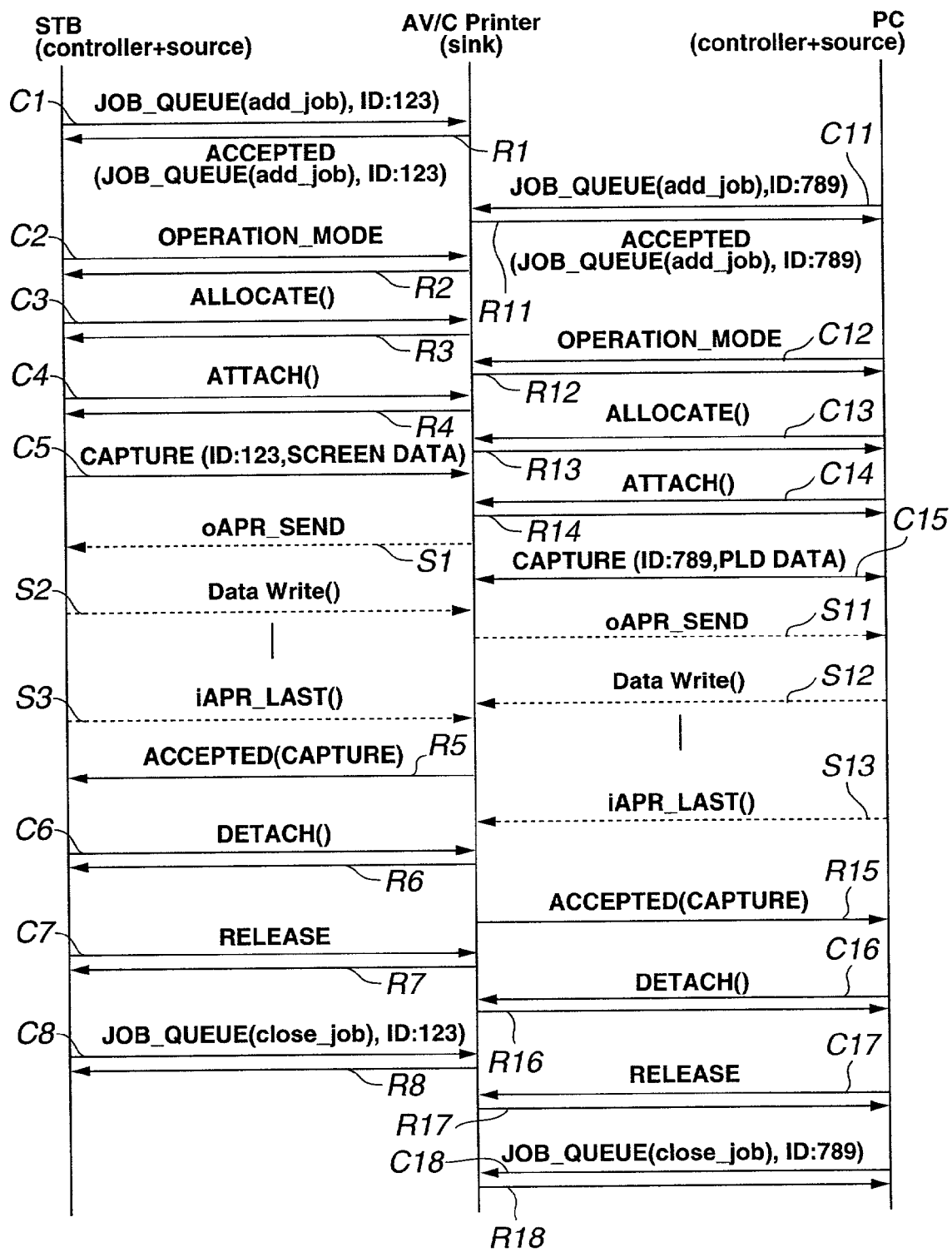
FIG. 16 is a flow chart of a printing procedure in which screen data is transmitted in the printing system according to the present invention from the STB connected to the IEEE 1394 serial bus to the AV/C printer subunit and print data (PDL data) is also transmitted from the desktop PC to the AV/C printer subunit at which the data will be printed.

Next, there will be described with reference to FIG. 16 operations effected in the printing system 1 for transmitting screen data from the STB 2 to the AV/C printer subunit via the IEEE 1394 serial bus 1A and PDL data from the desktop PC 3 to the AV/C printer subunit and printing the screen data at the AV/C printer subunit.

The AV/C printer subunit has a function to store screen data or PDL data transmitted from the STB 2 or desktop PC 3, respectively, and also a function (printer subunit implementation type: Multi sessions, Multi jobs) to simultaneously accept screen data and PDL data transmitted simultaneously from the STB 2 and desktop PC 3, respectively.

First, operations effected in transaction between the STB 2 and AV/C printer subunit, and then signal transfer effected between the STB 2, AV/C printer subunit and desktop PC 3, will be described below.

Before transmitting screen data, the STB 2 transmits a command packet C1 (JOB_QUEUE (add_job, ID: 123) for adding a job to the AV/C printer subunit and including a print execution request to the AV/C printer subunit. Thus, the AV/C printer subunit recognizes that there exists a job of printing a still image, and transmits a response packet R1 (ACCEPTED (JOB_QUEUE (add_job), ID: 123) informing that it will accept the print execution request. At this time, the AV/C printer subunit sets the value of cType/response to a capture command to "1001".

Next the STB 2 transmits, to the AV/C printer subunit, a command packet C2 including an operation mode (OPERATION_MODE) command specifying a type and size of a printing paper, printing quality, printing color (monochrome/color), printing position, etc. for the printing by the AV/C printer subunit, and receives a response packet R2 from the AV/C printer subunit.

The STB 2 sets a plug and port for transmitting screen data to the AV/C printer subunit. That is, the STB 2 first issues an open request for source plug/port of its own asynchronous connection to the data output unit 13 to set a source plug/port. Then, the STB 2 transmits a command packet C4 including a destination plug/port assign command and open request command (ALLOCATE) and receives a response packet R3 to the command packet C3.

Also, the STB 2 transmits a command packet C4 including a plug attaching command (ATTACH) informing that screen data transmitting is effected based on an asynchronous connection established between the source plug/port and destination plug/port, and receives a response packet R4 to the command packet C4. Thus, the STB 2 and AV/C printer subunit mutually recognize the source plug/port and destination plug/port, and establishes an asynchronous connection between the source and destination ports on the IEEE 1394 serial bus 1A.

Next, the STB 2 transmits a command packet C5 including a capture command (CAPTURE) requesting the AV/C printer subunit for reception of screen data. The capture command includes print data specifying information (MSB: $00_{16}$ to $10_{16}$) indicating that the screen data is to be displayed on the display unit 2B.

Next, the AV/C printer subunit transmits, to the STB 2, a request S1 (oAPR_Transmit) for transmitting screen data stored in a segment buffer provided in the STB 2 from the STB 2 to the AV/C printer subunit. The STB 2 receives the transmitting request at an output asynchronous port register (oAPR) provided in the data output unit 13. The "oAPR" is a register used to control the operation of the ports set at the controller and source units, and functions to receive a lock request from the AV/C printer subunit connected via the IEEE 1394 serial bus 1A, namely, receive mainly a data transmitting request.

Next, the STB 2 transmits screen data stored in the segment buffer thereof as data packets S2 sequentially to the AV/C printer subunit. The AV/C printer subunit stores the screen data sequentially received into an internal segment buffer thereof.

After completion of transmitting all the screen data, the AV/C printer subunit receives a transmitting completion information (iAPR_LAST) S3 indicating the completion of transmitting from the segment buffer of the STB 2. The AV/C printer subunit receives the transmitting completion information at an input asynchronous port register (iAPR) provided therein. The "iAPR" is a register used to control the operation of the port set at the consumer side, that is, the AV/C printer subunit, and functions to receive a lock request from the STB 2 or desktop PC 3 connected via the IEEE 1394 serial bus 1A, namely, receive the data transmitting completion information.

Next, the AV/C printer subunit transmits, to the STB 2, a response packet R5 informing that it has accepted the command packet C5 including a capture command.

In response to the response packet R5, the STB 2 transmits a command packet C6 including a detaching command (DETACH) instructing to stop the plug/port of the AV/C printer subunit from operating, and receives a response packet R6 from the AV/C printer subunit.

Next, the STB 2 transmits, to the AV/C printer subunit, a command packet C7 including a releasing command (RELEASE) for releasing the plug/port of the AV/C printer subunit, and receives a response packet R7 from the AV/C printer subunit.

Next, the STB 2 transmits, to the AV/C printer subunit, a command packet C8 (JOB_QUEUE (close_job, ID:123)) including printing completion information indicating the sequence of a job of printing the still image, and receives a response packet R8 to the command packet C8.

On the other hand, after the STB 2 transmits the command packet C1 to the AV/C printer subunit and before the STB 2 transmits the command packet C2 to the AV/C printer subunit, the desktop PC 3 transmits, to the AV/C printer subunit, a command packet C11 (JOB_QUEUE (add_job, ID:789)) including a print execution request, and receives a response packet R11 (ACCEPTED JOB_QUEUE (add_job), ID:789)). Thereafter, the desktop PC 3 transmits a command packet C12 (OPERATION MODE) to the AV/C printer subunit, and receives a response packet R12 to the command packet C12, Then, the desktop PC 3 transmits a command packet C13 (ALLOCATE) to the AV/C printer subunit, and receives a response packet R13 to the command packet R13. Next, the desktop PC 3 transmits a command attaching packet (ATTACH) C14 to the AV/C printer subunit, and receives a response command R14.

Thus the desktop PC 3 and AV/C printer subunit mutually recognize that the source plug/port and destination plug/port, and establish an asynchronous connection between the source and destination ports on the IEEE 1394 serial bus 1A. The AV/C printer subunit will set a different port from the one having the asynchronous connection with the STB 2, and establish an asynchronous connection between the port and desktop PC 3.

Next, the desktop PC 3 transmits a command packet C15 including a capture command (CAPTURE) to the AV/C printer subunit. The capture command includes print data specifying information (MSB: $40_{16}$) indicating that the PDL data has a page-description language (PDL) conforming to a one held by an internal printer drive. The AV/C printer subunit detects the print data specifying information included in the capture command, and judge whether it is necessary to convert the page-description language of subsequent PDL data to be transmitted.

Next, the AV/C printer subunit transmits, to the desktop PC 3, a request S11 (oAPR_Transmit) for transmitting PDL data stored in a segment buffer in the desktop PC 3 from the desktop PC 3 to the AV/C printer subunit, and the desktop PC 3 will receive the transmitting request at an oAPR (output asynchronous port register) provided in the system controller 44.

Next, the desktop PC 3 transmits PDL data stored in the segment buffer thereof sequentially as data packets C12 to the AV/C printer subunit, and the AV/C printer stores the thus received PDL data into the internal segment buffer thereof (see S12). The AV/C printer subunit stores the PDL data from the desktop PC 3 into a different segment buffer from that for the screen data received from the STB 2. Also, the AV/C printer subunit will convert the thus received PDL data as necessary.

After completion of transmitting of all the PDL data, the AV/C printer subunit is supplied with a transmitting completion information (iAPR_LAST) S13 indicative of the completion of transmitting segments to the AV/C printer subunit. The AV/C printer subunit receives the transmitting completion information S13 at an internal iAPR (input asynchronous port register).

Next, the AV/C printer subunit transmits, to the desktop PC 3, a response packet R15 informing that it has accepted a command packet C15 including a capture command.

In response to the response packet R15, the desktop PC 3 transmits a command packet C16 including a detaching command (DETACH), command C17 including a releasing command (RELEASE) and a command packet C18 (JOB_QUEUE (close_job, ID:789)) including a printing completion information to the AV/C printer subunit, and receives response commads R16, R17, R18 to the command packets C16, C17, and C18 respectively.

In the AV/C printer subunit having operated as in the above, the screen data from the STB 2 and PDL data from the desktop PC 3 can simultaneously be received and printed sequentially. Also, even when the AV/C printer subunit is supplied with screen data from the STB 2 and page-description language of PDL data from the desktop PC 3, it can interpret the types of these data, convert them to a page-description language interpretable by the AV/C printer subunit as necessary, and print the thus processed data.

Figure 17:
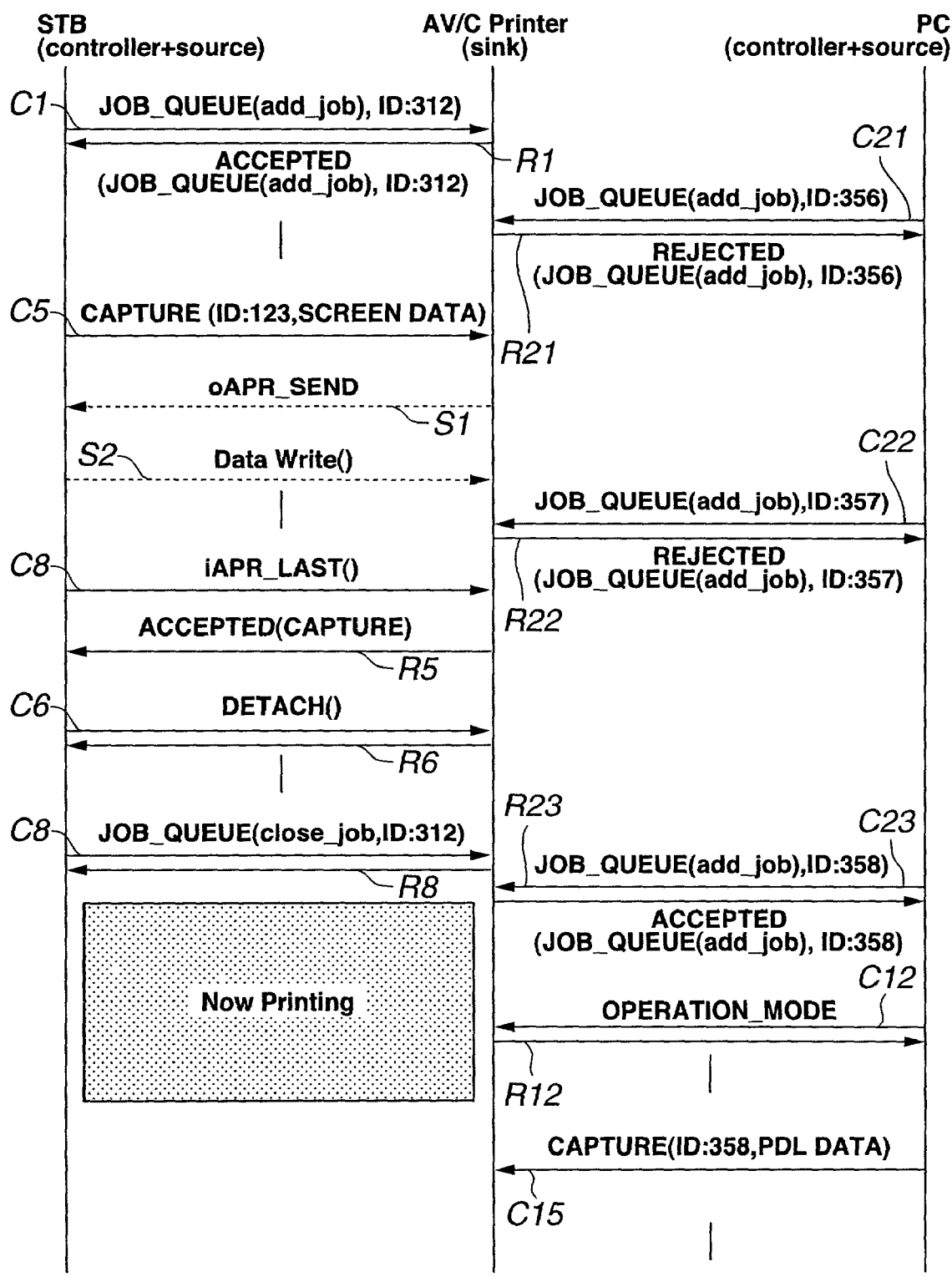
FIG. 17 is a flow chart of another printing procedure in which screen data is transmitted in the printing system according to the present invention from the STB connected to the IEEE 1394 serial bus to the AV/C printer subunit and print data (PDL data) is also transmitted from the desktop PC to the AV/C printer subunit.

Next, there will be described below with reference to FIG. 17 operations effected in the aforementioned printing system 1 for transmitting print data to the AV/C printer subunit from the STB 2 and desktop PC 3 connected to the IEEE 1394 serial bus 1A and printing the print data.

The AV/C printer subunit has a function to store screen data transmitted from the STB 2 or PDL data transmitted from the desktop PC 3, and a function (printer subunit implementation type: Single session, Multi jobs) to accept data to be used in a next printing work even while a printing work is being done by the print engine 33.

Note that in the following description, the same command packets and response packets as those having been described in the above with reference to FIG. 16 will appear with the same references as those for the previously described packets, respectively, but will not be described in detail.

For a period from accepting the command packet C1 (JOB_QUEUE (add_job, ID:312)) including a print execution request from the STB 2 until transmitting, to the STB 2, a response packet R8 to the command packet C8 (JOB_QUEUE (close_job, ID: 312)) including a printing completion information, even if the AV/C printer subunit receives, from the desktop PC 3, command packets C21 (JOB_QUEUE (add_job, ID:356)) and C22 (JOB_QUEUE (add_job, ID:357)), each including a print execution request, it will transmit, to the desktop PC 3, response packets R21 (REJECTED (JOB_QUEUE (add_job, ID: 356))) and R22 (REJECTED (JOB_QUEUE (add_job, ID:357))) informing that it cannot accept any print data.

After transmitting the response packet R8 (JOB_QUEUE (close_job, ID:312)) to the STB 2, the AV/C printer subunit make a printing work by the print engine 33. After transmitting the response packet R8 to the STB 2, the AV/C printer subunit will be able to accept a command from other unit connected to the IEEE 1394 serial bus 1A. That is, when receiving a command packet C23 (JOB_QUEUE (add_job, ID: 358)) after having transmitted the response command R8 including the print execution request from the desktop PC 3, the AV/C printer subunits transmits, to the desktop PC 3, a response packet R23 (ACCEPTED (JOB_QUEUE (add_job, ID:358))) informing that it will accept the print execution request.

Next, the AV/C printer subunit and desktop PC 3 will process the command packet C12 to response packet R18 as in the above, and make a printing work by the print engine 33.

The AV/C printer subunit exclusively controls the print execution request from other unit for a period from accepting of the command packet C1 until transmitting the response packet R8. However, the present invention is not limited to this example but the AV/C printer subunit may exclusively control a print execution request for a period from the command packet C5 including the capture command until the response command R5 or for a period from transmitting the transmitting request S1 (oAPR_Transmit) until reception of the transmitting completion information S3 (iAPR_LAST).

Figure 18:
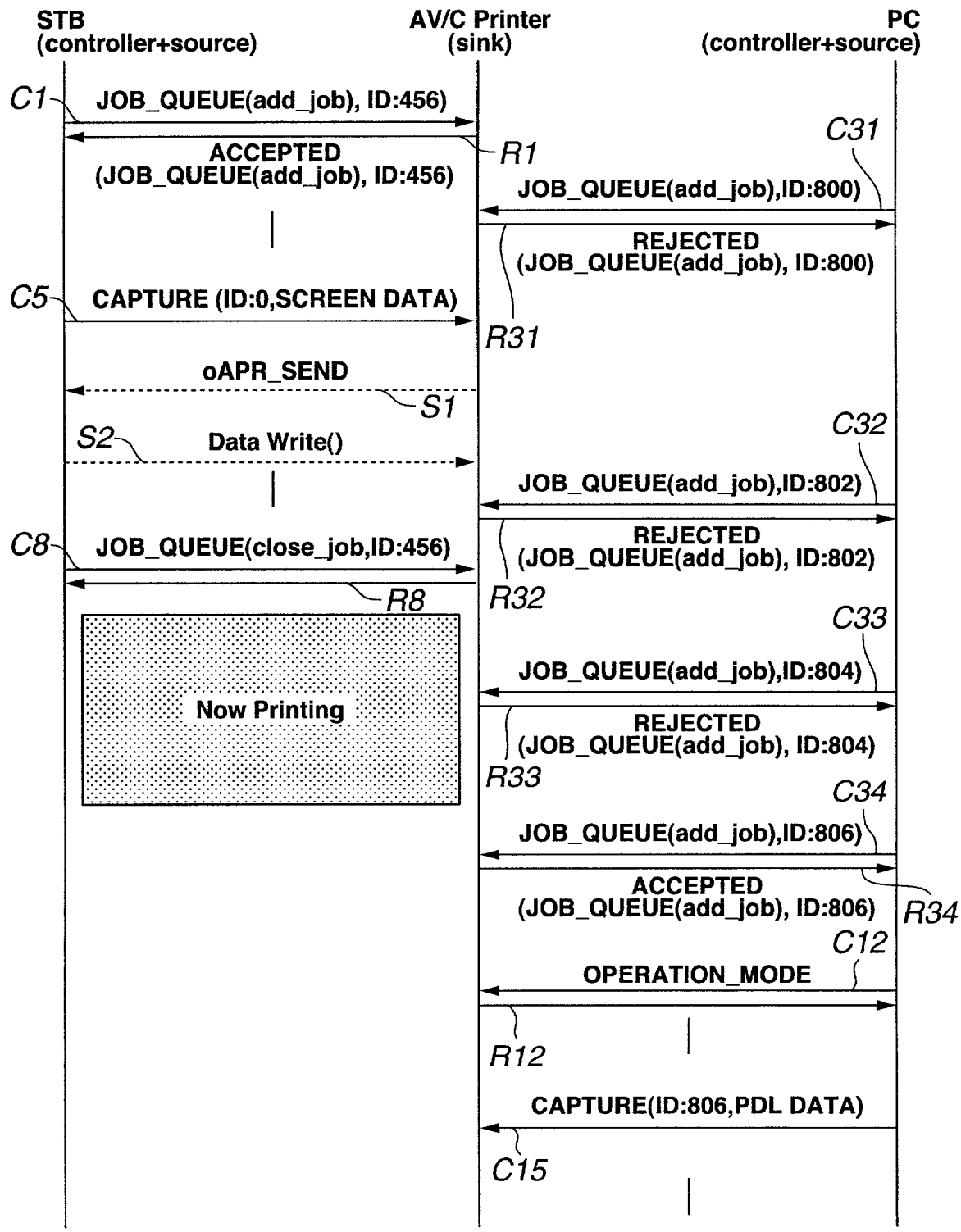
FIG. 18 is a flow chart of still another printing procedure in which screen data is transmitted in the printing system according to the present invention from the STB connected to the IEEE 1394 serial bus to the AV/C printer subunit and print data (PDL data) is also transmitted from the desktop PC to the AV/C printer subunit.

Next, there will be described with reference to FIG. 18 other operations effected in the printing system 1 for transmitting screen data and PDL data from the STB 2 and desktop PC 3, respectively, connected to the IEEE 1394 serial bus 1A, to the AV/C printer subunit and printing the data.

The AV/C printer subunit has a function (printer subunit implementation type: Single session, Single job) to accept data to be used in a next printing work when print data has been accepted at the data input unit 31 and printing work is completed by the print engine 33.

Note that in the following description, the same command packets and response packets as those having been described in the above with reference to FIG. 16 will appear with the same references as those for the previously described packets, respectively, but will not be described in detail.

Even if the AV/C printer subunit receives, from the desktop PC 3, command packets C31 (JOB_QUEUE (add_job, ID:800)) and C32 (JOB_QUEUE (add_job, ID: 802)) and C33 (JOB_QUEUE (add_job, ID: 804)), each including a print execution request for a period after accepting the command packet C1 (JOB_QUEUE (add_job, ID: 456)) including a print execution request from the STB 2 until completing the printing work by the print engine 33, it will transmit, to the desktop PC 3, response packets R31, R32 and R33 informing that it cannot accept any screen data.

After transmitting the response packet R8 (JOB_QUEUE (close_job, ID:456)) to the STB 2, the AV/C printer subunit make a printing work by the print engine 33. After completing the printing work by the print engine 33, the AV/C printer subunit will be able to accept a command from other unit connected to the IEEE 1394 serial bus 1A. That is, when receiving a command packet C34 (JOB_QUEUE (add_job, ID: 806)) including a print execution request from the desktop PC 3 after completion of the printing work by the print engine 33, the AV/C printer subunits transmits, to the desktop PC 3, a response packet R34 (ACCEPTED (JOB_QUEUE (add_job, ID: 806))) informing that it will accept the print execution request.

Next, the AV/C printer subunit and desktop PC 3 will process the command packet C12 to response packet R18 as in the above, and make a printing work by the print engine 33.

With the prior art, video data (screen data) can only be printed according to the IEEE 1394 AV/C protocol. In the printing system 1 having been described in the foregoing, however, the AV/C printer subunit can print not only video data (screen data) but print data in a page-description language (PDL).

Also in this printing system 1, when print data in a page-description language not supported by the AV/C printer subunit is printed, the page-description language at the print data source can be interpreted, the print data transmitted to the AV/C printer subunit can be converted to print data in a page-description language of the print data transmitted to the AV/C printer subunit, and the print data can be printed in a page-description language which can be supported by the AV/C printer subunit.

Further, in the printing system 1, since the page-description language can be converted at the AV/C printer subunit, the print data sources have not to be provided with many PDL drivers for supporting many page-description languages.

Figure 19:
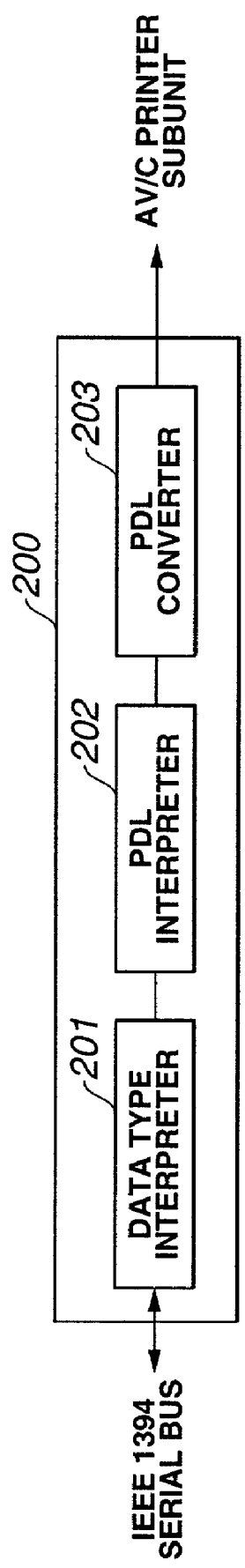
FIG. 19 is a block diagram of a data conversion subunit included in the printing system according to the present invention.

In the foregoing, an example in which PDL data is converted within the AV/C printer subunit has been described. However it should be noted that a data converter subunit may be provided to interpret the type of data received via the IEEE 1394 serial bus 1A and convert the data to data in a type of PDL supported by the AV/C printer subunit. In FIG. 19, the data converter subunit is generally indicated with a reference 200.

As shown in FIG. 19, the data converter subunit 200 is connected to the IEEE 1394 serial bus 1A and includes a data type interpreter 201, PDL interpreter 202 and a PDL converter 203.

The data converter subunit 200 establishes an asynchronous connection with the STB 2 and desktop PC 3, and is supplied with a capture command from the STB 2 or desktop PC 3.

Receiving the capture command, the data type converter 201 will refer to the value of print data specifying information included in the capture command and judge whether screen data or PDL data is to be supplied as print data. When the data type interpreter 201 has judged that screen data is to be supplied as print data, it will output the result of judgment to the AV/C printer subunit. On the other hand, when the data interpreter 201 has judged that PDL data is to be supplied as print data, it will output print data specifying information to the PDL interpreter 202.

The PDL interpreter 202 has a table by which each page-description language can be interpreted, as shown in FIGS. 10 to 12, and refers to the print data specifying information from the data type interpreter 201 to judge the type of a PDL (page-description language). The PDL interpreter 202 outputs the result of PDL judgment to the PDL converter 203.

The PDL converter 203 is supplied with a PDL data specified by the print data specifying information included in the capture command. The PDL converter 203 converts the supplied PDL data to a type of PDL data which can be supported by the AV/C printer subunit, and outputs the converted PDL data to the AV/C printer subunit.

Since a plurality of AV units is connected to the IEEE 1394 serial bus 1A in the printing system 1 provided with the above data converter subunit 200, even when a PDL data which cannot be supported by the AV/C printer 5, the data converter subunit 200 permits to convert the PDL data to a type of PDL data which can be supported by the AV/C printer subunit.

Therefore, in the printing system 1, even if many different types of controllers are connected to the IEEE 1394 serial bus 1A, they can allow the AV/C printer 5 to make a printing work.

As having been described in the foregoing, since the data converting apparatus and method according to the present invention can judge the type of print data transmitted from the printing controller based on print data specifying information included in a print data transmitting command and convert the print data to a type of print data which can be supported by the printing unit according to the result of judgment, even when many different types of printing controllers are connected to one serial bus and thus different types of print data are supplied to the printing unit, the apparatus and method can convert them to a type of print data which can be supported by the printing unit and thus allow the printing unit to print the print data.

What is claimed is:

1. A data converter for converting print data transmitted front a printing control unit to a printing unit via a serial bus the data converter comprising:
   receiving means for receiving moving picture data representative of a plurality of sequential images and for selecting a desired image therefrom;
   judging means for detecting print data specifying information included in a print data transmitting command supplied from the printing control unit for the desired image, and judging, based on the detected print data the type of the print data transmitted from the printing control unit; and
   conversion controlling means for converting, according to the result of the judgment made by the judging means, the print data transmitted from the printing control unit to the printing unit to print data of a type supported by the printing unit, and outputting the converted print data to the printing unit;
   wherein the judging means and the conversion controlling means provide printing support when there is no printer driver compatible with the printer as a target at the printing controller unit.

2. The data converter according to claim 1, wherein the serial bus is a one conforming to the IEEE (Institute of Electrical and Electronics Engineers) 1394 standard.

3. The data converter according to claim 1, wherein the judging means judges based on the print data specifying information including a type of page-description language of the print data; and
   the conversion controlling means converts, according to the result of the judgment made by the judging means, the print data transmitted from the printing control unit to print data in a type of page-description language supported by the printing unit.

4. The data converter according to claim 3, wherein the judging means judges, based on the print data specifying information, whether the print data transmitted from the printing control unit is video data or data described in a page-description language, and
   when the print data transmitted from the printing control unit has been judged to be video data, the conversion controlling means outputs the video data as it is to the printing unit while when the print data transmitted from the printing control unit has been judged to be data described in a page-description language, the conversion controlling means converts the print data transmitted from the printing control unit to print data in a type of page-description language supported by the printing unit.

5. A data converting method for converting print data transmitted from a printing control unit to a printing unit via a serial bus, the method comprising:
   a receiving step for receiving moving picture data representative of a plurality of sequential images and for selecting a desired image therefrom;
   a first step of inputting, from the printing control unit, a print data transmitting command indicating that the print data is going to he transmitted from the printing control unit to the printing unit;

a second step of detecting print data specifying information included in the supplied print data transmitting command;

a third step of judging, based on the selected desired image, a type of the print data transmitted from the printing control unit;

a fourth step of converting, according to the result of the judgment effected in the third step, the print data transmitted from the printing control unit to print data of a type supported by the printing unit; and a fifth step of outputting the converted print data to the printing unit;

wherein the third step and the fourth step provide printing support when there is no printer driver compatible with the printer as a target at the printing controller unit.

6. The data converting method according to claim 5, wherein the serial bus is a one conforming to the IEEE 1394 standard.

7. The data converting method according to claim 5, wherein the type of the print data in the third step is a type of page-description language of the print data; and the print data of the type supported by the printing unit in the fourth step is print data in a type of page-description language supported by the printing unit.

8. The data converting method according to claim 7, further comprising steps of:

judging, based on the print data specifying information, whether the print data transmitted from the printing control unit is video data or data described in a page-description language; and outputting the print data transmitted from the printing control unit, having been judged to be video data, as it is to the printing unit, while converting the print data transmitted from the printing control unit, having been judged to be data described in a page-description language, to print data in a type of page-description language supported by the printing unit.

9. A printer comprising:

receiving means for receiving moving picture data representative of a plurality of sequential images and for selecting a desired image therefrom;

a printing means for printing using print data;

an input/output means to which the print data and a control command are supplied from a printing control unit via a serial bus;

a judging means for detecting selected image data specifying information included in a print data transmitting command supplied to the input/output means and judging, based on the detected selected image data specifying information, an image type of the print data transmitted from the printing control unit;

means for converting, according to the result of the judgment, the supplied print data from a type transmitted by the printing control unit to print data of a type supported by the printing means; and means for controlling the printing means to print using the converted print data from the converting means;

wherein the judging means and the conversion controlling means provide printing support when there is no printer driver compatible with the printer as a target at the printing controller unit.

10. The printer according to claim 9, wherein the serial bus is a one conforming to the IEEE (Institute of Electrical and Electronics Engineers) 1394 standard.

11. The printer according to claim 9, wherein the judging means judges, based on the selected image data specifying information the type of the page-description language of the print data.

12. The printer according to claim 11, wherein the judging means judges, based on the selected image data specifying information, whether the print data transmitted from the printing control unit is video data or data described in a page-description language; and when the print data transmitted from the printing control unit has been judged to be video data, the conversion controlling means outputs the video data as it is to the printing means, while when the print data transmitted from the printing control unit has been judged to be data described in a page-description language, the conversion controlling means converts the print data transmitted from the printing control unit to print data in a type of page-description language supported by the printing means.

13. A printing method comprising:

receiving moving picture data representative of a plurality of sequential images and for selecting a desired image therefrom;

a first step of detecting selected image data specifying information included in a print data transmitting command transmitted from a printing control unit via a serial bus and judging, based on the detected specifying information, an image type;

a second step of inputting the print data from the printing control unit via the serial bus and converting, according to the result of the judgment, the supplied print data from a type supplied by the printing control unit to print data of a type supported by a printing unit; and a third step of printing using the converted print data;

wherein the first step and the second step provide printing support when there is no printer driver compatible with the printer as a target at the printing controller unit.

14. The printing method according to claim 13, wherein the serial bus is a one conforming to the IEEE 1394 standard.

15. The printing method according to claim 13, wherein the type of the print data in the third step is a type of page-description language of the print data; and the print data of the type supported by the printing unit in the third step is print data in a type of page-description language supported by the printing unit.

16. The printing method according to claim 15, further comprising steps of:

judging, based on the selected image data specifying information, whether the print data transmitted from the printing control unit is video data or data described in a page-description language; and outputting the print data transmitted from the printing control unit, having been judged to be video data, as it is to the printing unit, while converting the print data transmitted from the printing control unit, having been judged to be data described in a page-description language, to print data in a type of page-description language supported by the printing unit.

17. A printing control unit comprising:

means for receiving moving picture data representative of a plurality of sequential images and for selecting a desired image therefrom;

means for generating print data for use by a printing unit connected via a serial bus;

an input/output means for outputting a control command to control the printing unit and the print data to the printing unit via the serial bus;

means for generating a print data transmitting command including selected image data specifying information indicative of a type of the print data transmitted to the printing unit; and means for controlling the input/output means to output to the printing unit print data of a type indicated by the selected image data specifying information included in the print data transmitting command generated by the command generating means;

wherein the means for generating and the means for controlling provide printing support when there is no printer driver compatible with the printer as a target at the printing controller unit.

18. The printing control unit according to claim 17, wherein the serial bus is a one conforming to the IEEE 1394 standard.

19. The printing control unit according to claim 17, wherein the command generating means generates a print data transmitting command including selected image data specifying information for use to identify the type of a page-description language corresponding to a manufacturer of the printing unit.

20. The printing control unit according to claim 17, wherein the command generating means generates a print data transmitting command including print data specifying information for use to identify the type of a page-description language corresponding to a type of the printing unit.

21. The printing control unit according to claim 17, wherein the command generating means generates a print data transmitting command including selected image data specifying information for use to judge whether the print data transmitted to the printing unit is video data or data described in a page-description language.

22. A printing controlling method in which data to be printed by a printing unit connected via a serial bus is outputted to the printing unit, the method comprising:

receiving moving picture data representative of a plurality of sequential images and for selecting a desired image therefrom;

a first step of generating a print data transmitting command including selected image data specifying information indicative of a type of the print data transmitted to the printing unit and outputting the print data transmitting command to the printing unit; and a second step of transmitting, to the printing unit, print data of a type indicated by the selected image data in the print data transmitting command;

wherein the first step and the second step provide printing support when there is no printer driver compatible with the printer as a target at the printing controller unit.

23. The printing controlling method according to claim 22, wherein the serial bus is a one conforming to the IEEE 1394 standard.

24. The printing controlling method according to claim 22, wherein the selected image data specifying information indicative of the type of print data in the first step is print data specifying information for use to identify a type of a page-description language corresponding to a manufacturer of the printing unit.

25. The printing controlling method according to claim 22, further comprising a step of:

generating a print data transmitting command including print data specifying information for use to identify the type of a page-description language corresponding to the type of the printing unit.

26. The printing controlling method according to claim 22, further comprising a step of:

generating a print data transmitting command including selected image data specifying information for use to judge whether the print data outputted to the printing unit is data described in a page-description language or video data.

27. A printing system comprising:

a printing control unit including:

means for receiving moving picture data representative of a plurality of sequential images and for selecting a desired image therefrom;

means for generating data to be printed by a printing unit connected via a serial bus;

a first input/output means for outputting a control command to control the printing unit and the print data to the printing unit via the serial bus; and means for generating a print data transmitting command including selected image data specifying information indicative of a type of the print data transmitted to the printing unit;

the printing unit including:

a second input/output supplied with the print data and control command from the printing control unit; and means for printing utilizing the print data supplied from the printing control unit via the second input/output means;

the printing control unit controlling the first input/output means to output to the printing unit the print data transmitting command generated by the command generating means;

the printing unit detecting the selected image data specifying information included in the print data transmitting command supplied from the second input/output means via the serial bus, judging, based on the detected print data specifying information, the type of the print data transmitted from the printing control unit, and converting, according to the result of the judgment, the supplied print data from a type transmitted by the printing control unit to print data of a type supported by the printing unit, so as to provide printing support when there is no printer driver compatible with the printer as a target at the printing controller unit.

28. A printing method in which print data is transmitted via a serial bus from a printing control unit to a printing unit which prints the print data, the method comprising the steps of receiving moving picture data representative of a plurality of sequential images and for selecting a desired image therefrom;

generating a print data transmitting command including selected image data specifying information indicative of a type of the print data and outputting the print data transmitting command from the printing control unit to the printing unit;

detecting the selected image data specifying information included in the print data transmitting, command transmitted from the printing control unit to the printing unit and judging the image type of the print data transmitted from the printing control unit;

inputting the print data transmitted from the printing control unit via the serial bus to the printing unit;

converting, according to the result of the judgment, the supplied print data from a type transmitted by the printing control unit to print data of a type supported by the printing unit; and printing at the printing unit by the use of the converted print data, so as to provide printing support when there is no printer driver compatible with the printer as a target at the printing controller unit.

29. A printing system comprising:
a printing control unit including:
means for receiving moving picture data representative of a plurality of sequential images and for selecting a desired image therefrom;
means for generating data to be printed by a printing unit connected via a serial bus;
a first input/output means for outputting a control command to control the printing unit by the use of the print data generated by the print data generating means, and the print data to the printing unit; and
means for generating a print data transmitting command including print data specifying information indicative of the image type of the selected image data transmitted to the printing unit; and
the printing unit including:
a second input/output means connected to the serial bus and to which the print data and control command are supplied from the printing control unit; and
means for printing utilizing the print data supplied from the printing control unit via the second input/output means,
the printing control unit controlling the first input/output means to transmit the print data transmitting command generated by the command generating means to the printing unit;
the printing unit judging the type of the print data indicated by the selected image data specifying information included in the print data transmitting command; and outputting to the printing control unit the result of the judgment indicating whether the type of the selected image data, indicated by the print data specifying information, is supported by the printing means; and
the printing control unit outputting, based on the insult of the judgment from the printing unit, print data of a type supported by the printing means to the printing unit;
so as to provide printing support when there is no printer driver compatible with the printer as a target at printing controller unit.

30. A printing method in which print data is transmitted from a printing control unit to a printing unit via a serial bus and printed by the printing unit, the method comprising the steps of:
receiving moving picture data representative of a plurality of sequential images and for selecting a desired image therefrom;
generating a print data transmitting command including selected image data specifying information indicative of the type of the print data and outputting the print data transmitting command from the printing control unit to the printing unit;
detecting the selected image data specifying information included in the print data transmitting command transmitted from the printing control unit to the printing unit;
judging the type of the print data transmitted from the printing control unit;
outputting the result of the judgment, indicating whether the type of the print data, indicated by the selected image data specifying information, is supported by the printing unit; and
outputting print data of a type supported by the printing unit from the printing control unit to the printing unit, so as to provide printing support when there is no printer driver compatible with the printer as a target at the printing controller unit.

31. A printing system comprising:
a printing control unit including:
means for receiving moving picture data representative of a plurality of sequential images and for selecting a desired image therefrom;
a print data generating means for generating data to be printed by a printing unit connected to the print data generating means via a serial bus;
a first input/output means outputting a control command to control the printing unit which makes a printing work by the use of the pint data generated by the print data generating means, and the print data to the printing unit; and
means for generating a prim data transmitting command including selected image data specifying information indicative of a type of the print data; and
a data converting unit including:
means for detecting the selected image data specifying information included in the print data transmitting command supplied from the printing control unit and judging, based on the detected selected image data specifying information, the image type of the print data transmitted from the printing control unit;
means for converting, according to the result of the judgment by the judging means, the print data transmitted from the printing control unit to print data of a type supported by the printing unit, and outputting the converted print data to the printing unit; and
the printing unit including:
a third input/output means supplied with the converted print data and print data transmitting command from the data converting block; and
means for utilizing the converted print data supplied from the third input/output means, so as to provide printing support when there is no printer driver compatible with the printer as a target at the printing controller unit.

32. A printing method in which print data is transmitted from a printing control unit to a printing unit via a serial bus for printing by the printing unit, the method comprising, the steps of:
receiving moving picture data representative of a plurality of sequential images and for selecting a desired image therefrom;
generating a print data transmitting command including data specifying information indicative of the type of the print data and outputting the command from the printing control unit to a data converting block;
detecting selected image data specifying information included in the print data transmitting command transmitted from the printing control unit to the data converting block;
judging the image type of the selected image data transmitted from the printing control unit;
transmitting the selected image data from the printing control unit to the data converting block;
converting, according to the result of the judgment, the supplied print data from a type of print data transmitted by the printing control unit to print data of a type supported by the printing unit;
outputting the converted print data from the data converting block to the printing unit; and
printing at the printing unit the converted print data from the data converting block, so as to provide printing support when there is no printer driver compatible with the printer as a target at the printing controller unit.

33. A data transmitting method in which print data is transmitted from a printing control unit to a printing unit via a serial bus, the method comprising steps of:

receiving moving picture data representative of a plurality of sequential images and for selecting a desired image therefrom;

generating, at the printing control unit, a print data transmitting command including selected image data specifying information indicative of a type of the print data and transmitting the command from the printing control unit to the printing unit;

judging, at the printing control unit, whether the print data of the image type indicated by the selected image data specifying information can be printed or not, based on the response of the printing unit to the print data transmitting command; and deciding, at the printing control unit, when it has been judged that the print data of the image type designated with the initially designated selected image data specifying information cannot be printed, to include, into the data transmitting command, print data identification information different from the initially designated one and output the different data it transmitting command again to the printing unit, or deciding, when it has been judged that the print data of the image type designated with the initially designated print data specifying information can be printed, to transmit the print data of the designated type to the printing unit;

so as to provide printing support when there is no printer driver compatible with the printer as a target at the printing controller unit.

* * * * *